United States Patent
Peng et al.

(10) Patent No.: US 11,304,220 B2
(45) Date of Patent: Apr. 12, 2022

(54) METHOD AND DEVICE FOR SCHEDULING TRANSMISSIONS BASED ON CHANNEL NUMEROLOGY

(71) Applicant: Huawei Technologies Co., Ltd., Shenzhen (CN)

(72) Inventors: Jinlin Peng, Shanghai (CN); Hao Tang, Shanghai (CN); Yi Wang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 16/712,547

(22) Filed: Dec. 12, 2019

(65) Prior Publication Data
US 2020/0120701 A1    Apr. 16, 2020

Related U.S. Application Data

(63) Continuation of application No. PCT/CN2018/091671, filed on Jun. 15, 2018.

(30) Foreign Application Priority Data

Jun. 16, 2017   (CN) .......................... 201710459585.7

(51) Int. Cl.
*H04W 72/12* (2009.01)
*H04W 72/04* (2009.01)
(Continued)

(52) U.S. Cl.
CPC ....... *H04W 72/1273* (2013.01); *H04L 1/1642* (2013.01); *H04L 5/0094* (2013.01); *H04W 72/042* (2013.01)

(58) Field of Classification Search
CPC .......... H04W 72/1273; H04W 72/042; H04W 72/0446; H04W 72/1284; H04W 72/1289;
(Continued)

(56) References Cited

U.S. PATENT DOCUMENTS

2017/0105124 A1   4/2017 Tomeba et al.
2017/0367046 A1*  12/2017 Papasakellariou .... H04L 5/0048
(Continued)

FOREIGN PATENT DOCUMENTS

CN    106465043 A    2/2017
EP    3518600 A1    7/2019
(Continued)

OTHER PUBLICATIONS

LG Electronics, "Discussion on multi-slot/cross-slot scheduling for NR," 3GPP TSG RAN WG1 Meeting #89, R1-1707651, Hangzhou, P.R. China, May 15-19, 2017, 4 pages.
(Continued)

*Primary Examiner* — Hoang-Chuong Q Vu
(74) *Attorney, Agent, or Firm* — Slater Matsil, LLP

(57) ABSTRACT

This application relates to the field of wireless communication, and in particular, to a wireless communication method and a device. This application provides a method, including: if a time unit used to transmit control information is different from a time unit used to transmit data, and the control information is related to the data, determining a time sequence based on a same time unit.

18 Claims, 13 Drawing Sheets

---

A base station sends a plurality of sets to UE, where the set is a set including different values of a time sequence

↓

The base station sends a correspondence between at least one of a time unit and a subcarrier spacing, and a set to the UE

↓

The base station sends DCI information to the UE, where the DCI includes information used to indicate the value of the time sequence

↓

The UE determines the time sequence based on the correspondence between at least one of a time unit and a subcarrier spacing, and a set, and the information used to indicate the value of the time sequence in the DCI information

(51) Int. Cl.
*H04L 1/16* (2006.01)
*H04L 5/00* (2006.01)

(58) Field of Classification Search
CPC ... H04L 1/1642; H04L 5/0094; H04L 5/0053; H04L 5/0048; H04L 5/0055; H04L 5/0057; H04L 5/001
See application file for complete search history.

(56) References Cited

U.S. PATENT DOCUMENTS

| | | | |
|---|---|---|---|
| 2018/0132258 A1 | 5/2018 | Andou et al. | |
| 2018/0242316 A1 | 8/2018 | Takeda et al. | |
| 2018/0279327 A1* | 9/2018 | Ying | H04W 72/0446 |
| 2018/0279344 A1* | 9/2018 | Bagheri | H04W 72/044 |
| 2018/0331816 A1 | 11/2018 | Harada et al. | |
| 2020/0015256 A1* | 1/2020 | Lee | H04W 72/1268 |
| 2020/0022175 A1* | 1/2020 | Xiong | H04L 5/001 |
| 2020/0196343 A1* | 6/2020 | Marinier | H04L 1/1854 |
| 2020/0267753 A1* | 8/2020 | Adjakple | H04W 72/1226 |
| 2020/0351914 A1* | 11/2020 | Dahlman | H04W 56/0045 |
| 2021/0211343 A1* | 7/2021 | Baldemair | H04W 72/1263 |

FOREIGN PATENT DOCUMENTS

| | | |
|---|---|---|
| WO | 2017033568 A1 | 3/2017 |
| WO | 2017033839 A1 | 3/2017 |
| WO | 2017038674 A1 | 3/2017 |
| WO | 2017078372 A1 | 5/2017 |
| WO | 2018175820 A1 | 9/2018 |

OTHER PUBLICATIONS

NTT Docomo, Inc. et al., "WF on scheduling and HARQ-ACK feedback timing," 3GPP TSG RAN WG1 AH_NR Meeting, R1-1701354, Spokane, USA, Jan. 16-20, 2017, 4 pages.

Intel Corporation, "Scheduling aspects for carrier aggregation," 3GPP TSG-RAN WG1 #88bis, R1-1704768, Spokane, Apr. 3-7, 2017, 3 pages.

Intel Corporation, "Timing relationships for DL scheduling," 3GPP TSG RAN WG1 #89, R1-1707403, Hangzhou, P.R. China, May 15-19, 2017,t 5 pages.

Samsung, "HARQ-ACK Feedback Timing," 3GPP TSG RAN WG1 Meeting #89, R1-1708026, Hangzhou, China, May 15-19, 2017, 3 pages.

Samsung, "Processing time and number of HARQ processes", 3GPP TSG RAN WG1 Meeting #88, R1-1702991, Athens, Greece, Feb. 13-17, 2017, 4 pages.

Intel Corporation, "Scheduling aspects for carrier aggregation", 3GPP TSG-RAN WG1 #89, R1-1707416, Hangzhou, P.R. China, May 15-19, 2017, 3 pages.

Catt, "HARQ and scheduling timing design for LTE sTTI," 3GPP TSG RAN WG1 Meeting #88, R1-1702056, Athens, Greece, Feb. 13-17, 2017, 5 pages.

Ericsson, "On Mixed Numerology," 3GPP TSG-RAN WG1 #89, R1-1709094, Hangzhou, China, May 15-19, 2017, 3 pages.

* cited by examiner

METHOD AND DEVICE FOR SCHEDULING TRANSMISSIONS BASED ON CHANNEL NUMEROLOGY

CROSS-REFERENCE TO RELATED APPLICATIONS

This application is a continuation of International Application No. PCT/CN2018/091671, filed on Jun. 15, 2018, which claims priority to Chinese Patent Application No. 201710459585.7, filed on Jun. 16, 2017. The disclosures of the aforementioned applications are hereby incorporated by reference in their entireties.

TECHNICAL FIELD

This application relates to the field of wireless communication technologies, and in particular, to a wireless communication method and a device.

BACKGROUND

To meet requirements of increasing service types, a fifth generation (5G) mobile communications system is required to support three types of application scenarios: enhanced mobile broadband (eMBB), ultra-reliable and low latency communications (URLLC), and massive machine type communications (mMTC). Because there are obvious differences in service features, reliability requirements, and latency requirements of various application scenarios, different services have different requirements for system parameters such as a subcarrier spacing, a symbol length, and a time unit.

In data transmission, data is transmitted at a granularity of a time unit. In the 5G system, to meet different requirements of different services, a flexible mechanism of performing data transmission by using the subcarrier spacing and the time unit is proposed. That is, in 5G, the time unit may be different. For example, on a same carrier, different time units may be used to perform uplink communication and downlink communication; and in a scenario of carrier aggregation, time units used between carriers may also be different.

However, use of different time units for communication may cause inconsistent time sequences between a base station and user equipment.

SUMMARY

This application describes a wireless communication method and a device, so as to determine a time sequence based on a same timing criterion, and resolve a problem of time sequence inconsistency in different scenarios of different carrier parameters due to different service requirements, thereby ensuring smooth communication.

According to an aspect, an embodiment of this application provides a wireless communication method. The method includes: if a time unit used to transmit control information is different from a time unit used to transmit data, and the control information is related to the data, determining a time sequence based on a same time unit. Being based on the same time unit may be understood as being based on a same time unit, being based on a same time unit principle, or being based on a same timing criterion. Therefore, timing is performed based on the same time unit criterion, so as to ensure consistent time sequences between a base station and a terminal, thereby ensuring smooth communication and meeting different service requirements.

In a possible design, the determining a time sequence based on a same time unit includes: determining a first time sequence K0 and a second time sequence K1 based on the same time unit, where the first time sequence K0 is a time relationship between a time unit for transmitting a physical downlink control channel PDCCH and a time unit for transmitting a physical downlink shared channel PDSCH, the PDCCH is used to transmit the control information, and the PDSCH is used to transmit data scheduled by using the control information; and the second time sequence K1 is a time relationship between the time unit for transmitting the PDSCH and a time unit for transmitting a PUCCH or a PUSCH, the PDSCH is used to transmit data, the PDCCH or the PUSCH is used to transmit control information corresponding to the data, and the control information is uplink feedback information corresponding to the data. Therefore, the first time sequence and the second time sequence are determined based on the same time unit, so that time sequences are consistent.

In a possible design, a third time sequence K2 is further determined based on the same time unit, where the third time sequence K2 is a time relationship between the time unit for transmitting the PDCCH and the time unit for transmitting the PUSCH, the PDCCH is used to transmit the control information, and the PUSCH is used to transmit uplink data scheduled by using the control information. The first time sequence, the second time sequence, and the third time sequence are determined based on the same time unit, so that time sequences are consistent, thereby ensuring smooth communication and simplifying a system design.

In a possible design, the determining a time sequence based on a same time unit includes: determining the time sequence based on the time unit used to transmit data; or determining the time sequence based on the time unit used to transmit control information; or determining the time sequence based on a longer time unit in the time unit used to transmit control information and the time unit used to transmit data; or determining the time sequence based on a shorter time unit in the time unit used to transmit control information and the time unit used to transmit data; or determining the time sequence based on a source time unit or a target time unit; or determining the time sequence based on a reference time interval. Therefore, this application provides a plurality of methods for determining a time sequence for flexible selection.

In a possible design, a time sequence is determined based on a same time unit, and the method further includes: sending downlink control information (DCI) used for scheduling downlink transmission to user equipment (UE), where the DCI used for scheduling downlink transmission includes a first indication field used to indicate a value of K0 and a second indication field used to notify a value of K1, and a quantity of bits occupied by the first indication field is equal to a quantity of bits occupied by the second indication field. Therefore, DCI signaling overheads can be reduced, and flexibility of K0 and K1 can be ensured.

In a possible design, the method further includes: sending the downlink control information (DCI) used for scheduling uplink transmission to the user equipment UE, where the DCI used for scheduling uplink transmission includes a third indication field used to notify value information of K2; and a quantity of bits occupied by the third indication field, a quantity of bits occupied by the first indication field, and a quantity of bits occupied by the second indication field are equal, or a quantity of bits occupied by the third indication field is equal to a sum of the quantity of bits occupied by the first indication field and the quantity of bits occupied by the second indication field.

In a possible design, the method further includes at least one of the following: sending at least one first set and a relationship between the first set and the time unit to the UE, where the first set includes at least one different value of K0; sending at least one second set and a relationship between the second set and the time unit to the UE, where the second set includes at least one different value of K1; and sending at least one third set and a relationship between the third set and the time unit to the UE, where the second set includes at least one different value of K2. Therefore, the UE may determine a set based on a time unit or a subcarrier spacing, and determine a specific time sequence based on a value of the time sequence indicated in the DCI.

According to another aspect, this application provides a device, and the device may implement related functions of the method provided in this application. The functions may be implemented by using hardware, or may be implemented by executing corresponding software by hardware. The hardware or software includes one or more modules corresponding to the foregoing functions.

According to another aspect, this application provides a device, and the device includes a processor, a transmitter, and a receiver. If a time unit used to transmit control information is different from a time unit used to transmit data, and the control information is related to the data, the processor is configured to determine a time sequence based on a same time unit. The device may implement related functions of the method provided in this application.

According to an aspect, this application provides a computer storage medium, configured to store a computer software instruction used by the foregoing data sending device. The computer storage medium includes a program designed to execute the foregoing aspects.

According to still another aspect, this application provides a computer storage medium, configured to store a computer software instruction used by the foregoing data receiving device. The computer storage medium includes a program designed to execute the foregoing aspects.

According to another aspect, this application provides a chip system, and the chip system includes a processor, configured to support the device to implement the functions in the foregoing aspects. The chip system may include a chip, or may include a chip and another discrete device.

This application describes a wireless communication method and a device, so as to determine a time sequence based on a same timing criterion, and resolve a problem of time sequence inconsistency in different scenarios of different carrier parameters due to different service requirements, thereby ensuring smooth communication.

BRIEF DESCRIPTION OF THE DRAWINGS

The following describes in more details the embodiments of this application with reference to accompanying drawings.

DETAILED DESCRIPTION OF ILLUSTRATIVE EMBODIMENTS

The following clearly and completely describes the technical solutions in the embodiments of this application with reference to the accompanying drawings in the embodiments of this application.

Network architectures and service scenarios described in the following embodiments of this application are intended to describe the technical solutions in the embodiments of this application more clearly, but are not intended to limit the technical solutions provided in the embodiments of this application. A person of ordinary skill in the art may know that as the network architectures evolve and a new service scenario emerges, the technical solutions provided in the embodiments of this application may be further applied to a similar technical problem.

Technologies described in the present invention can be applied to a Long Term Evolution (LTE for short) system, or other wireless communications systems in which various radio access technologies are used, for example, systems in which access technologies such as Code Division Multiple Access, Frequency Division Multiple Access, Time Division Multiple Access, orthogonal frequency division multiple access, and single carrier frequency division multiple access are used, and may be further applied to a subsequent evolved system in which the LTE system such as the 5th Generation 5G system is used.

Figure 1:
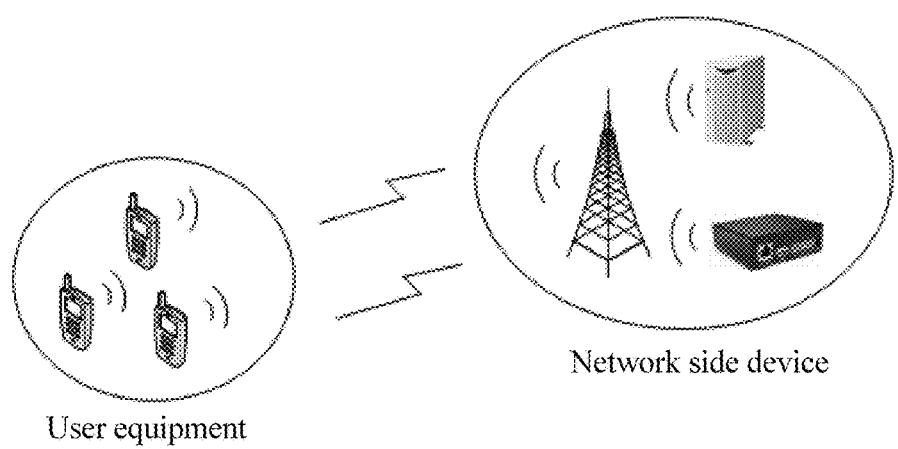
FIG. 1 shows a schematic diagram of a possible application scenario of this application.

FIG. 1 shows a schematic diagram of a possible application scenario of this application. User equipment (UE) accesses a network side device by using a wireless interface to perform communication, or may communicate with another user equipment, for example, communication in a device-to-device (D2D) scenario or a machine-to-machine (M2M) scenario.

The network side device may communicate with the user equipment, or may communicate with another network side device, for example, communication between a macro base station and an access point. In this application, nouns "network" and "system" are usually interchangeably used, but meanings of the nouns may be understood by a person skilled in the art. The user equipment in this application may include various handheld devices having a wireless communication function, in-vehicle devices, wearable devices, computing devices, control devices, or another processing device connected to a wireless modem, and include UE, a mobile station (MS), a terminal, terminal equipment, or the like in various forms. For ease of description, in this application, all the devices mentioned above are collectively referred to as user equipment. The network side device in this application includes a base station (BS), a network controller, a mobile switching center, or the like. An apparatus that directly communicates with the user equipment by using a radio channel is usually a base station. The base station may include a macro base station, a micro base station, a relay node, an access point, a remote radio unit (RRU), or the like in various forms. Certainly, the apparatus that performs wireless communication with the user equipment may be another network side device that has a wireless communication function. This is not uniquely limited in this application. In different systems, names of devices that have a base station function may be different, for example, an evolved NodeB (eNB or eNodeB), a NodeB, and a transmission and reception point (Transmission and Reception Point, TRP).

The technical solutions provided in this application may be applied to uplink data transmission and/or downlink data transmission. For the uplink data transmission, a data sending device may be the user equipment, and a data receiving device may be the network side device such as the base station. For the downlink data transmission, the data sending device may be the network side device, for example, the base station, and the data receiving device may be the user equipment.

Figure 2:
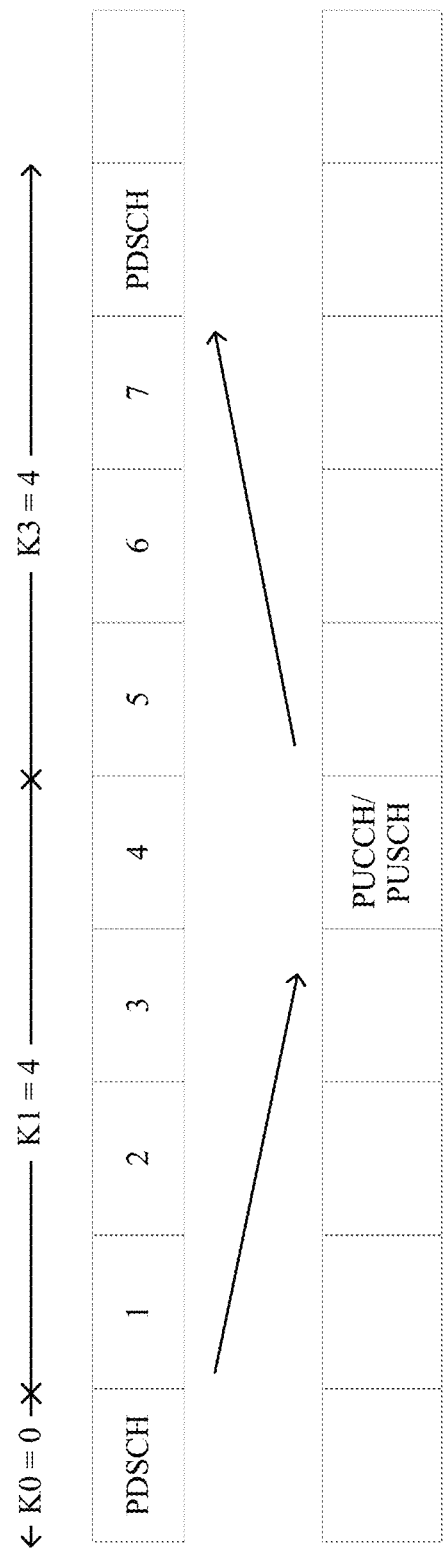
FIG. 2 shows an example diagram of downlink communication in an LTE technology.

FIG. 2 shows an example diagram of downlink communication in an LTE technology.

The downlink communication in the existing LTE technology is used as an example. A time interval between a time unit used for downlink scheduling and a time unit used for corresponding downlink data transmission is denoted as K0 time units in this application. A time unit in LTE may be fixed, for example, 1 ms. In FIG. 2, a cell in each row may be considered as one time unit.

Specifically, if downlink scheduling information is sent by using a physical downlink control channel (PDCCH) in an $n^{th}$ time unit, the downlink scheduling information may be downlink control information (DCI), and a corresponding time unit used for downlink data transmission by using a physical downlink shared channel (PDSCH) is an $(n+K0)^{th}$ time unit. In a current LTE system, K0 may be 0.

In the existing LTE technology, to ensure reliability of data communication, a hybrid automatic repeat request (HARQ) mechanism is introduced, that is, after sending data, a transmit end needs to wait for a receive end to feed back confirmation information, where the confirmation information may be acknowledgement (ACK) information or negative acknowledgement (NACK) information.

A time interval between the time unit used for downlink data transmission and a time unit used for feeding back corresponding confirmation information is denoted as K1 time units in this application. Specifically, if downlink data is sent by using the PDSCH in the $n^{th}$ time unit, a corresponding time unit used for confirmation information transmission by using a physical uplink shared channel (PUSCH) or a physical uplink control channel (PUCCH) is an $(n+K1)^{th}$ time unit. In the current LTE system, K1 may be 4.

A time interval between the time unit used for feeding back confirmation information and a time unit used for corresponding data retransmission is denoted as K3 time units in this application. Specifically, if the confirmation information is fed back in the $n^{th}$ time unit by using the PUSCH or the PUCCH, a corresponding time unit used by a base station for performing data retransmission is an $(n+K3)^{th}$ time unit. In the current LTE system, K3 may be 4.

As shown in FIG. 2, in the LTE, if K0=0, K1=4, and K3=4, to ensure continuous downlink transmission, a quantity of required processes is 8.

Figure 3:
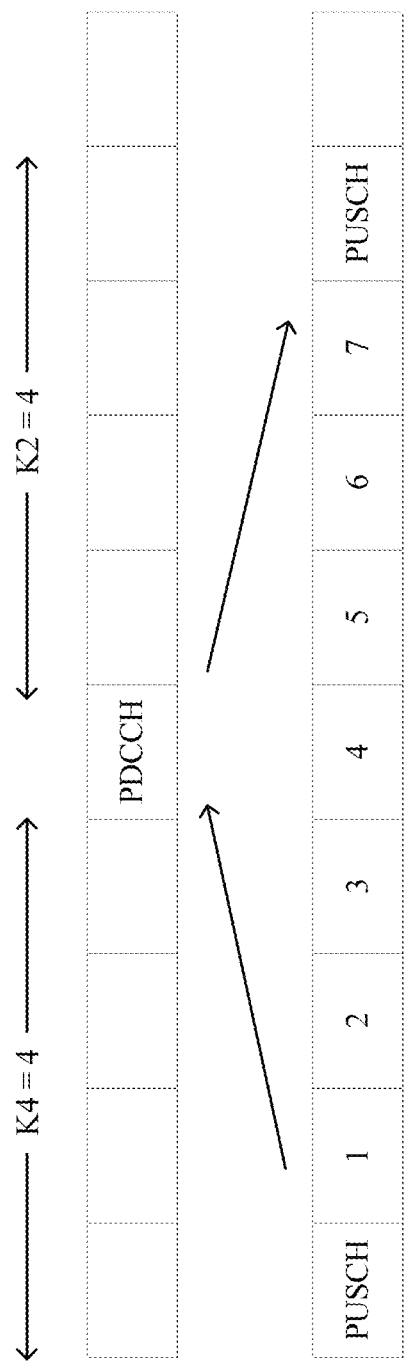
FIG. 3 shows an example diagram of uplink communication in an LTE technology.

FIG. 3 shows an example diagram of uplink communication in an LTE technology.

The existing uplink communication in LTE is used as an example. A time interval between a time unit used for uplink scheduling and a time unit used for corresponding uplink data transmission is denoted as K2 time units in this application. For a definition of the time unit, reference may be made to related description in FIG. 2.

Specifically, if downlink scheduling information is sent in an $n^{th}$ time unit by using a PDCCH, a corresponding time unit used for uplink data transmission by using a PUSCH is an $(n+K2)^{th}$ time unit.

A time interval between the time unit used for uplink data transmission and a time unit used for corresponding uplink data retransmission scheduling is denoted as K4 time units in this application. Specifically, if uplink data transmission is performed in the $n^{th}$ time unit by using the PUSCH, the corresponding time unit used for uplink data retransmission scheduling by using the PDCCH is an $(n+K4)^{th}$ time unit.

As shown in FIG. 3, in the LTE, if K2=4, and K4=4, to ensure continuous uplink transmission, a quantity of required processes is 8.

Currently, in the LTE, K0 is 0. In frequency division duplex (FDD) mode, K1 and K2 are 4; and in time division duplex (TDD) mode, K1 and K2 are fixed values, and may be specifically determined based on subframe configuration of TDD. K3 and K4 are mainly determined based on a capability and a scheduling status of a base station. In the FDD mode in the LTE, K3 and K4 are 4.

Definitions of the foregoing K0, K1, K2, K3, and K4 may be referenced again in a subsequent evolution system. K0, K1, K2, K3, and K4 are referred to as a time sequence in this application.

To meet different requirements of different services, subcarrier spacings between different carriers and used time units may be different. Configured subcarrier spacings are different; configured transmissions based on a slot or based on a mini-slot are different; and configured slot numbers, mini-slot numbers, and symbol numbers are different. This may result in different time units. Time units used for uplink and downlink transmission on a same carrier may also be different. In this case, how to determine a time sequence to ensure normal communication between a base station and user equipment is a problem that needs to be resolved.

All embodiments of this specification are described by using different time units. The different time units can also be replaced with different subcarrier spacings, different symbol numbers, or different carrier parameters numerology to describe all the embodiments of this specification. A carrier configuration parameter (numerology) of a carrier may include a subcarrier spacing, a time unit length, a CP type, or the like.

Therefore, an embodiment of this application provides a wireless communication method. The method may be performed by a network side device, such as a base station, or user equipment.

If a time unit used to transmit control information is different from a time unit used to transmit data, a time sequence is determined based on a same time unit.

If configured subcarrier spacings or used time units are different, a uniform time sequence may be determined based on the same time unit used as a basic unit, so as to improve robustness, ensure normal communication between the base station and the user equipment, and simplify a system design. Being based on the same time unit may be understood as being based on a same time unit, being based on a same time unit principle, or being based on a same timing criterion.

The control information is related to the transmitted data. Specifically, the control information is downlink scheduling information (for example, DCI), and is transmitted by using the PDCCH; and the data is downlink data corresponding to the downlink scheduling information, and is transmitted by using a PDSCH. Alternatively, the data is downlink data, and is transmitted by using the PDCCH; and the control information is uplink control information, and is transmitted by using the PUSCH or a PUCCH, for example, the control information may be confirmation information such as an acknowledgement ACK message or a negative acknowledgement NACK message. Alternatively, the control information is downlink control information DCI, and is transmitted by using the PDCCH; and the data is uplink data scheduled by using the downlink control information, and is transmitted by using the PUSCH. That is, the control information may be control information for scheduling data, or feedback information corresponding to the data (used to determine whether retransmission may be performed, and may be the confirmation information, for example, the ACK or NACK message). For subsequent description of the control information, the data, and corresponding channels, reference may be made to this section. This is not limited in this application.

A time sequence is determined based on a same time unit. Alternatively, a time sequence is determined based on a same time unit principle, or based on a same timing criterion. A plurality of time sequences may be determined based on a same unit. The plurality of time sequences may be a first time sequence. The first time sequence may be K0, and is used to indicate a time relationship between a time unit for transmitting a PDCCH and a time unit for transmitting a PDSCH. That is, if the base station sends the downlink scheduling information in a time unit n, the downlink scheduling information may be the DCI information, and corresponding downlink data is subsequently sent in a time unit n+K0. Alternatively, the plurality of time sequences may be determined based on the same time unit. The plurality of time sequences may include a second time sequence. The second time sequence may be K1, and is used to indicate a time relationship between a time unit for transmitting a PDSCH and a time unit for transmitting a PUSCH or a PUCCH. That is, if the base station sends the downlink data in a time unit n, uplink feedback information (the ACK or NACK message) corresponding to the downlink data is transmitted in a time unit n+K1.

The plurality of time sequences may be determined based on the same time unit. The plurality of time sequences may be a third time sequence. The third time sequence may be K2, and is used to indicate a time relationship between PDCCH transmission and PUSCH transmission. That is, if the base station sends the downlink scheduling information (may be the DCI) in a time unit n, the corresponding uplink data is transmitted in a time unit n+K2. Optionally, K3 or K4 may be further determined based on the same time unit.

It should be noted that K0, K1, K2, K3, and K4 may be subsequently used for description in this embodiment of this application, but a name of the time sequence is not limited or may be expressed in another form.

In addition, it should be noted that the PDCCH may not fully occupy a whole time unit. For example, one time unit in LTE is 1 ms with 14 symbols, and the PDCCH usually occupies only 1 to 3 symbols. Similarly, the PDSCH, the PUSCH, and the PUCCH may not fully occupy a whole time unit. In another system, names of the foregoing channels may be different. For example, NR may be NR-PDCCH, NR-PDSCH, NR-PUSCH, and NR-PUCCH. This is not limited in this specification.

Therefore, a time sequence is determined based on a same time unit. This can improve robustness and simplify a system design.

Further, the foregoing plurality of time sequences are determined based on the same timing criterion. For example, the time sequence may be determined based on the time unit used to transmit control information, or the time sequence may be determined based on the time unit used to transmit data, or the time sequence may be determined based on a longer time unit in the time unit used to transmit control information and the time unit used to transmit data, or the time sequence may be determined based on a shorter time unit in the time unit used to transmit control information and the time unit used to transmit data. Alternatively, the time sequence is determined based on a reference time interval that may be 1 ms or seven symbols. This is not limited in this application. Alternatively, the time sequence may be determined based on a source time unit. For the first time sequence (a time relationship between a PDCCH and a PDSCH), the time unit for transmitting the PDCCH is used as a timing criterion or a timing unit. For the third time sequence (a time relationship between a PDCCH and a PUSCH), the time unit for transmitting the PDCCH is used as a timing criterion or a timing unit. For the second time sequence (a time relationship between a PDSCH and a PUSCH/PUCCH), the time unit for transmitting the PDCCH is used as a timing criterion or a timing unit. Alternatively, the time sequence may be determined based on a target time unit, for example, for the first time sequence K0 (a time relationship between a PDCCH and a PDSCH), the time unit for transmitting the PDCCH is used as a timing criterion or a timing unit; for the third time sequence K2 (a time relationship between a PDCCH and a PUSCH), the time unit for transmitting the PUCCH is used as a timing criterion or a timing unit; and for K1 (the time relationship between the PDSCH and the PUSCH/PUCCH), the time unit for transmitting the PUSCH/PUCCH is used as a timing criterion or a timing unit. Alternatively, the time sequence is determined based on the time unit used to transmit data, for example, for the first time sequence K0 (a time relationship between a PDCCH and a PDSCH), the time unit for transmitting the PDCCH is used as a timing criterion or a timing unit; for the third time sequence K2 (a time relationship between a PDCCH and a PUSCH), the time unit for transmitting the PUCCH is used as a timing criterion or a timing unit; and for the second time sequence K1 (a time relationship between a PDSCH and a PUSCH/PUCCH), the time unit for transmitting the PDCCH is used as a timing criterion or a timing unit. Therefore, a time sequence is determined based on a same time unit, that is, a time sequence is determined based on a same timing criterion, so as to ensure quality of communication between a base station and a terminal, thereby improving robustness.

In an embodiment of this application, the base station may send a plurality of sets to the UE. The plurality of sets may be a set of one or more K0s, a set of one or more K1s, a set of one or more K2s, and the like. The base station sends a correspondence between the sets and at least one of the subcarrier spacing and the time unit to the UE. The base station further sends indication information to the UE. The indication information may indicate a value of the time sequence. The UE may determine the set based on the foregoing correspondence, and determine a specific value of the time sequence based on the indication information. Therefore, the base station sends a plurality of different time sequence values, the UE determines different sets based on the subcarrier spacing or the time unit, and further determines the time sequence based on the indication information, so that flexible scheduling may be performed if different subcarriers or different time units are scheduled.

In an embodiment of this application, the embodiment is related to scheduling. The base station configures the PDCCH, and the corresponding PDSCH or PUSCH, where X>a ratio of a time unit length of the PDCCH to a time unit length of the PDSCH/PUSCH>1/Y, and X and Y are positive integers. Optionally, both X and Y are equal to 2 or 4. Alternatively, the base station configures the PDCCH, and the corresponding PDSCH or PUSCH, and subcarrier spacings of the PDCCH and the corresponding PDSCH or PUSCH are subcarrier spacings supported by the UE. For example, if the UE supports 15 kHz, 60 kHz, and 120 kHz, the PDCCH, and the corresponding PDSCH or PUSCH are configured as an adjacent combination including 15 and 60 or an adjacent combination including 60 and 120. Alternatively, a plurality of carriers that are configured or activated for the UE are classified into at least one carrier group, and cross-carrier scheduling and/or cross-carrier aggregation feedback may be performed in the carrier group.

In a possible implementation, carriers included in one carrier group have a same subcarrier spacing or a same time unit length, that is, a network device (such as a base station) uses the same subcarrier spacing or the same time unit length as a division criterion, and classifies a plurality of carriers that are configured or activated for the terminal into at least one carrier group. Therefore, the grouping manner can greatly simplify cross-carrier scheduling or feedback. In addition, in another possible implementation, a maximum of one carrier group includes carriers with different subcarrier spacings or different time unit lengths. For example, the network device may first use the same subcarrier spacing or the same time unit length as a division criterion, classify a plurality of carriers that are configured for the terminal into at least one carrier group, and then use remaining carriers as one carrier group.

In a possible implementation, carriers included in one carrier group have a maximum of two different types of subcarrier spacings or time unit length configuration, that is, there are a maximum of two different types of subcarrier spacings or time unit length configuration in a carrier allocated for each carrier group by the network device, so that complexity of cross-carrier scheduling or feedback is simplified. This avoids relatively high complexity of cross-carrier scheduling and feedback due to an extremely large quantity of types of subcarrier spacings or time unit length configuration in the carrier.

Further, optionally, carriers included in one carrier group have a maximum of two different types of subcarrier spacings or time unit length configuration. The two different types of subcarrier spacings or time unit length configuration are two types of adjacent carrier spacings or time unit lengths that are supported by the terminal or a system. For example, there are carriers whose subcarrier spacings are configured as 15 kHz, 60 kHz, and 120 kHz. Carriers whose subcarrier spacings are configured as 15 kHz and 60 kHz are classified into one group, but carriers whose subcarrier spacings are configured as 15 kHz and 120 kHz cannot be classified into one group.

In an embodiment of this application, the embodiment is related to feedback. The base station configures the PDSCH, and the corresponding PUCCH or PUSCH, where X>a ratio of a time unit length of the PDSCH to a time unit length of the PUCCH/PUSCH>1/Y, and X and Y are positive integers. Optionally, both X and Y are equal to 2 or 4. The base station configures the PDSCH, and the corresponding PUCCH or PUSCH, and subcarrier spacings of the PDSCH, and the corresponding PUCCH or PUSCH are adjacent subcarrier spacings supported by the UE. For example, if the UE supports 15 k, 60 k, and 120 k, an adjacent combination including 15 and 60 or an adjacent combination including 60 and 120 is configured, but a combination including 15 and 120 cannot be configured. When the base station classifies the carriers, a maximum of one group includes carriers with different subcarrier spacings or time unit lengths, for example, 10 carriers are classified into four groups. Grouping is performed based on whether the subcarrier spacings or the time unit lengths are the same. Remaining different subcarrier spacings or time unit lengths are classified into one group. When the base station classifies the carriers, each group includes a maximum of two carriers with different subcarrier spacings or time unit lengths.

It should be noted that the transmission time unit may be a subframe and a transmission time interval (one transmission time interval is equal to a sum of lengths of several subframes, or a sum of several transmission time intervals is equal to a length of one subframe), or may be one time domain symbol, a plurality of time domain symbols, one slot (slot), an aggregation of a plurality of slots, one mini-slot (mini-slot), an aggregation of a plurality of mini-slots, or an aggregation of a mini-slot and a slot, or the like. A subcarrier spacing may be 15 kHz*2^n (n is a positive integer), that is, a subcarrier spacing is 15 kHz, 30 kHz, or the like. The transmission time unit is determined by a subcarrier spacing and a symbol number. A configured subcarrier spacing or slot number, mini-slot number, and symbol number may result in different time units. Therefore, configuration solutions or description related to the transmission time unit in all the embodiments of this specification may be replaced with configuration solutions or description related to the subcarrier spacing.

The following provides description with reference to embodiments of different time units or different subcarrier spacings. The following embodiments may be performed by a base station or user equipment.

Figure 4:
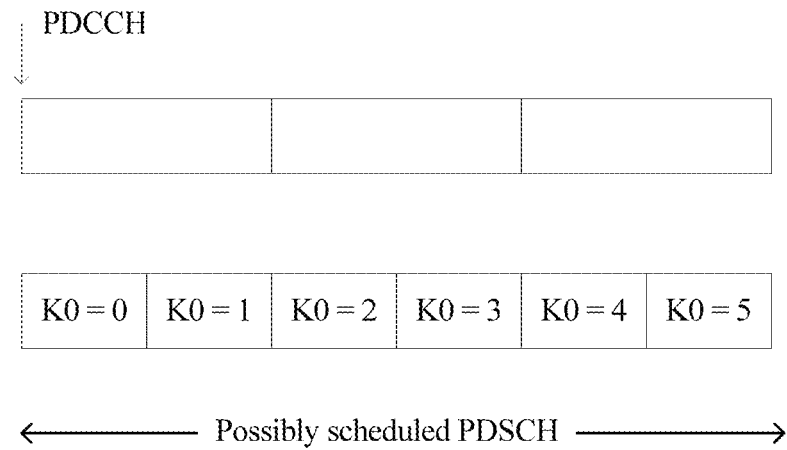
FIG. 4 shows an example diagram of an embodiment according to this application.

FIG. 4 shows an example diagram of an embodiment according to this application.

As shown in FIG. 4, a time unit used to transmit control information is greater than a time unit used to transmit data. As shown in FIG. 4, a first time unit of a carrier 1 is used to transmit a PDCCH, and a time unit on a carrier 2 may be used to transmit a corresponding PDSCH. A first column in FIG. 4 indicates the time unit used by the carrier 1, and a second column indicates the time unit used by the carrier 2.

The time unit in this application is a minimum time interval for transmission, and may be a subframe, or may be one or more time domain symbols, one slot (slot) or an aggregation of a plurality of slots, one mini-slot (mini-slot) or an aggregation of a plurality of mini-slots, or the like. Herein, the time unit used by the carrier 1 is greater than the time unit used by the carrier 2. A subcarrier spacing may be 15 kHz*2^m (m is a positive integer), that is, a subcarrier spacing is 15 kH, 30 kHz, and the like. A transmission time unit is determined by a subcarrier spacing and a symbol quantity. Therefore, configuration solutions or description related to the transmission time unit in this embodiment of this application may be replaced with configuration solutions or description related to the subcarrier spacing. Herein, the time unit used by the carrier 1 is greater than the time unit used by the carrier 2, or a subcarrier spacing used by the carrier 1 is less than a subcarrier spacing used by the carrier 2.

In an embodiment of this application, a shorter time unit is used as a basic time unit for determining a time sequence. In this application, a PDCCH is used to perform downlink scheduling, and a PDSCH is used to perform downlink data transmission. A time relationship between a time unit used to transmit the PDCCH and a time unit used to transmit the PDSCH is denoted as K0. In this case, if a shorter time unit is used as a basic time unit, K0 may be 0, 1, 2, . . . , or 5. This is not limited in this application.

Figure 5:
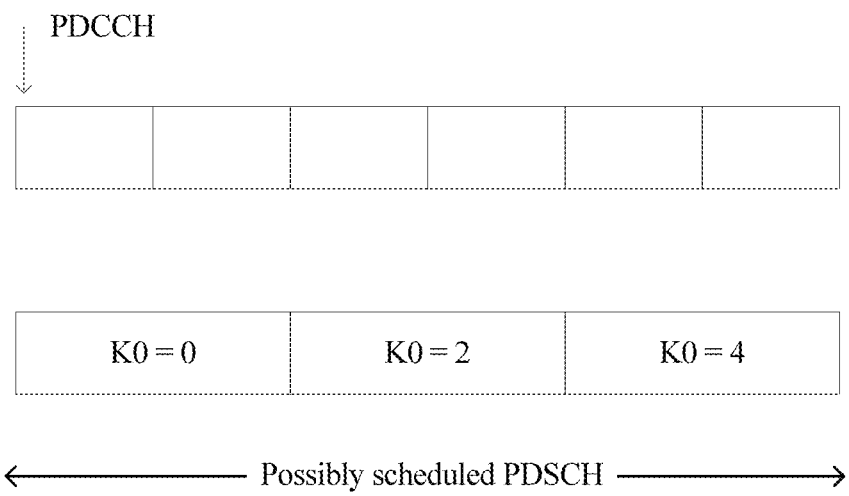
FIG. 5 shows an example diagram of an embodiment according to this application.

FIG. 5 shows an example diagram of an embodiment according to this application.

As shown in FIG. 5, a time unit used to transmit control information is less than a time unit used to transmit data. As shown in FIG. 5, a first time unit of a carrier 1 is used to schedule a PDCCH, and a time unit of a carrier 2 may be used to schedule a corresponding PDSCH. As shown in FIG. 5, two time units used to schedule the PDCCH are aligned with the time unit that may be used to schedule the PDSCH.

In an embodiment of this application, a shorter time unit is used as a basic time unit for determining a time sequence.

In this application, the PDCCH is used to perform downlink scheduling, the PDSCH is used to perform corresponding downlink data transmission, and a time relationship between a time unit used to transmit the PDCCH and a time unit used to transmit the PDSCH is K0. If a shorter time unit is used as a basic time unit, based on a time interval between the shorter time unit and a time unit for downlink scheduling, the time unit that is used to schedule the PDSCH and that is at a distance of no more than one time unit from the time unit used by the PDCCH is used as a $0^{th}$ time unit, and corresponding K0 may be 0, 2, or 4.

Figure 6:
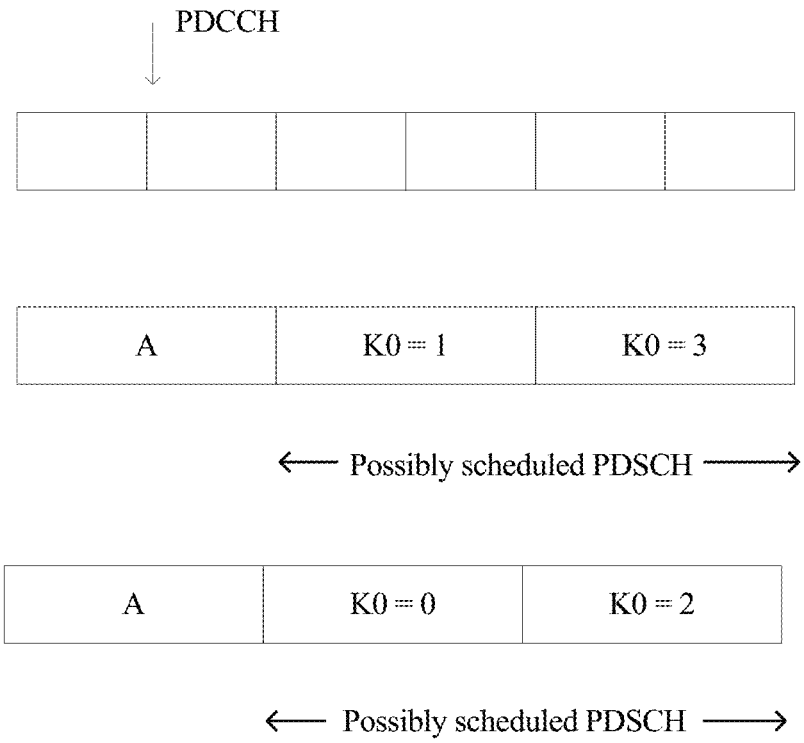
FIG. 6 shows an example diagram of an embodiment according to this application.

FIG. 6 shows an example diagram of an embodiment according to this application.

A difference between FIG. 6 and FIG. 5 is that a location of a time unit used to transmit a PDCCH is already at the latter part of a corresponding time unit A that is used by a carrier 2 (it is assumed that M shorter time units are aligned with one longer time unit (the time unit A), the time unit used to transmit the PDCCH is an $i^{th}$ time unit of the M shorter time units, where i>1, and for a corresponding part in subsequent embodiments, reference may be made to the description herein). In this case, a time unit used by a corresponding PDSCH may be a next time unit of the A time unit. Optionally, if a shorter time unit is used as a basic time unit, a distance between the next time unit of the A time unit and the time unit used to transmit the PDCCH is one shorter time unit. In this case, K0 of the next time unit of the A time unit is denoted as 1, K0 of a next but one time unit may be denoted as 3, and K0 of the following time unit is successively increased by 2; and the rest may be deduced by analogy. In this embodiment, K0 of a time unit that may be used to schedule the PDSCH is 1 or 3. This is not limited in this application.

Alternatively, because the time unit used to transmit the PDCCH is already at the latter part of the time unit A, it is already relatively difficult to schedule the time unit A herein. K0 of a next time unit of the A time unit is denoted as 0, a next but one time unit may be denoted as 2, and K0 of the following time unit is successively increased by 2; and the rest may be deduced by analogy. In this embodiment, K0 of a time unit that may be used to schedule the PDSCH is 0 or 2. This is not limited in this application.

Figure 7:
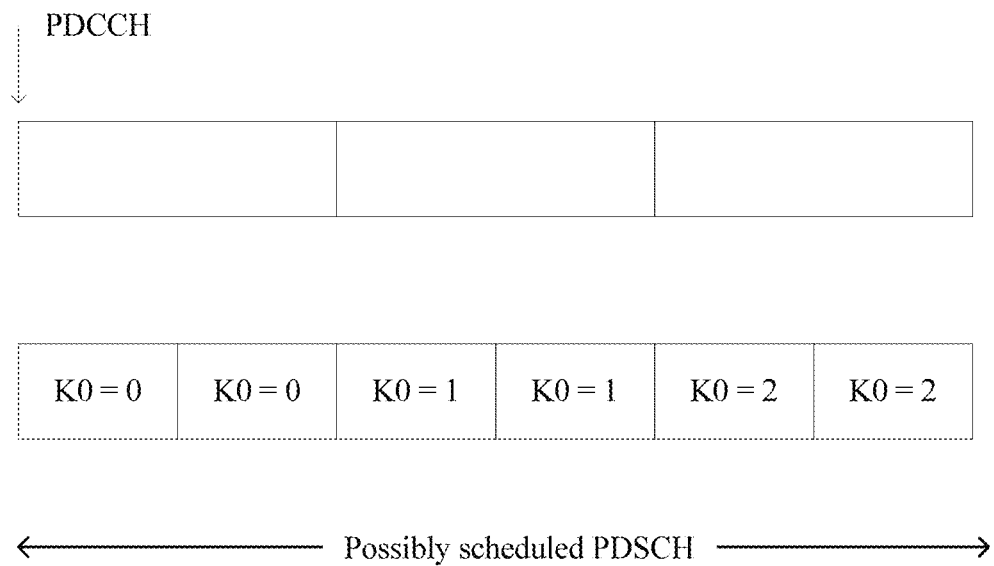
FIG. 7 shows an example diagram of an embodiment according to this application.

FIG. 7 shows an example diagram of an embodiment according to this application.

As shown in FIG. 7, a time unit used to transmit control information is greater than a time unit used to transmit data. As shown in FIG. 7, a first time unit of a carrier 1 is used to transmit a PDCCH, and a time unit on a carrier 2 may be used to transmit a corresponding PDSCH. The time unit used by the carrier 1 is greater than the time unit used by the carrier 2 herein. Two time units used to schedule the PDCCH are aligned with a time unit that may be used to schedule the PDSCH.

In an embodiment provided in this application, a longer time unit is used as a basic time unit for determining a time sequence.

In this application, the PDCCH is used to perform downlink scheduling, the PDSCH is used to perform corresponding downlink data transmission, and a time relationship between a time unit used to transmit the PDCCH and a time unit used to transmit the PDSCH is denoted as K0. If a longer time unit is used as a basic time unit, based on a time interval between the longer time unit and a time unit for downlink scheduling, the time unit that is used to schedule the PDSCH and that is in one time range with the time unit used by the PDCCH is used as a $0^{th}$ time unit, and corresponding K0 may be 0, 0, 1, 1, 2, or 2; and the rest may be deduced by analogy. This is not limited in this application.

Figure 8:
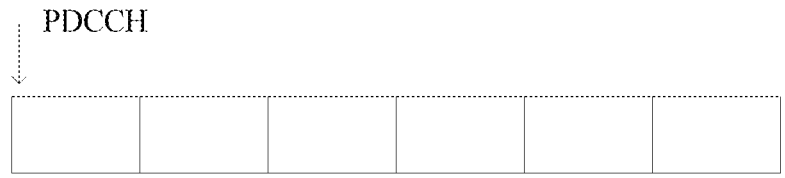
FIG. 8 shows an example diagram of an embodiment according to this application.
Figure 8:
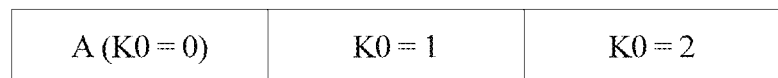
Figure 8:
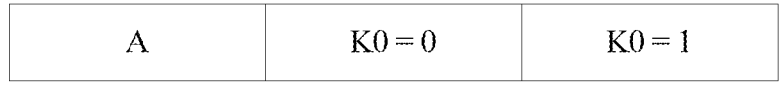

FIG. 8 shows an example diagram of an embodiment according to this application.

In this embodiment, a time unit used to transmit control information is less than a time unit used to transmit data. As shown in FIG. 8, a first time unit of a carrier 1 is used to schedule a PDCCH, and a time unit of a carrier 2 may be used to schedule a corresponding PDSCH. As shown in FIG. 8, two time units used to schedule the PDCCH are aligned with the time unit that may be used to schedule the PDSCH.

In an embodiment of this application, a longer time unit is used as a basic time unit for determining a time sequence.

In this application, the PDCCH is used to perform downlink scheduling, the PDSCH is used to perform corresponding downlink data transmission, and a time relationship between a time unit used to transmit the PDCCH and a time unit used to transmit the PDSCH is K0. If a longer time unit is used as a basic time unit, based on a time interval between the longer time unit and the time unit used to transmit the PDCCH, K0 of the time unit (a time unit A in the figure) that may be used to transmit the PDSCH and that is at a distance of no more than one longer time unit from the time unit used by the PDCCH is 0, K0 of a next time unit is 1, and by analogy, a value of K0 is successively increased by 1; or K0 of the time unit that may be used to transmit the PDSCH and that is at a distance of no more than one longer time unit from the time unit used to transmit the PDCCH is 0, that is, K0 of the first time unit after the time unit A is 0, K0 of a subsequent time unit is 1, and by analogy, a value of K0 is successively increased by 1.

Figure 9:
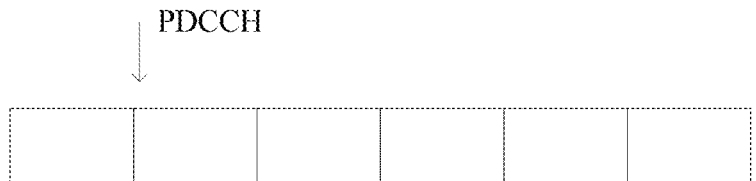
FIG. 9 shows an example diagram of an embodiment according to this application.
Figure 9:
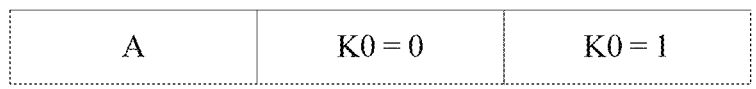
Figure 9:
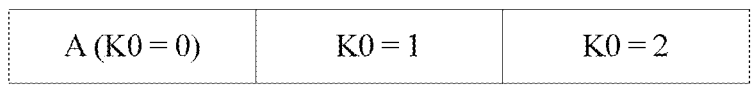

FIG. 9 shows an example diagram of an embodiment according to this application.

A difference between FIG. 9 and FIG. 8 is that a location of a time unit used to transmit a PDCCH is already at the latter part of a time unit A used by a carrier 2 (it is assumed that M shorter time units are aligned with one longer time unit (the time unit A), and the time unit used to transmit the PDCCH is an $i^{th}$ time unit of the M shorter time units, where i>1). In this case, if a longer time unit is used as a basic time unit for determining a time sequence, K0 of a time unit that is a time unit if a distance between the corresponding time unit used to transmit the PDSCH and the time unit used to transmit the PDCCH is no more than one longer time unit is denoted as 0, that is, in FIG. 9, K0 of a first time unit after the time unit A is denoted as 0, K0 of a subsequent time unit is 1, and K0 of a subsequent time unit is successively increased by 1; and the rest may be deduced by analogy. In this embodiment, K0 of a time unit that may be used to transmit the PDSCH may be 0 or 1.

Alternatively, a longer time unit is used as a basic time unit, and in FIG. 9, a time interval between the time unit A and the time unit used to transmit the PDCCH is no more than one longer time unit. In this case, K0 of A is denoted as 1, K0 of a subsequent time unit is successively increased by 1; and the rest may be deduced by analogy. In this embodiment, K0 of a time unit that may be used to transmit the PDSCH may be 0, 1, or 2.

This application further provides an embodiment. In this embodiment, a length of a time unit used to transmit control information is different from that of a time unit used to transmit data. In this embodiment, the control information is transmitted by using the PDCCH that may be used to send downlink scheduling information. The downlink scheduling information is used to perform uplink scheduling, for example, DCI information. The data is transmitted by using a PUSCH that is used to perform corresponding uplink data transmission. In this case, an interval between a time unit used for uplink scheduling and a time unit used for uplink and downlink data transmission may still be denoted as a time sequence K2. Reference may be made to the description about use of a shorter time unit or a longer time unit as a basic time unit for determining a time sequence in the foregoing embodiments.

This application further provides an embodiment. In this embodiment, a length of a time unit used to transmit control information is different from that of a time unit used to transmit data. In this embodiment, a data channel is the PDSCH used to send downlink data. The control information is confirmation information that may be fed back for the downlink data, for example, acknowledgement (ACK) information or negative acknowledgement (NACK) information corresponding to the downlink data. The control information is transmitted by using the PUSCH or a PUCCH. In this case, a time relationship between the time unit used to transmit control information and the time unit used to transmit data may be denoted as K1. Reference may be made to the description about use of a shorter time unit or a longer time unit as a basic time unit for determining a time sequence in the foregoing embodiments. The following provides description with reference to a diagram.

Figure 10:
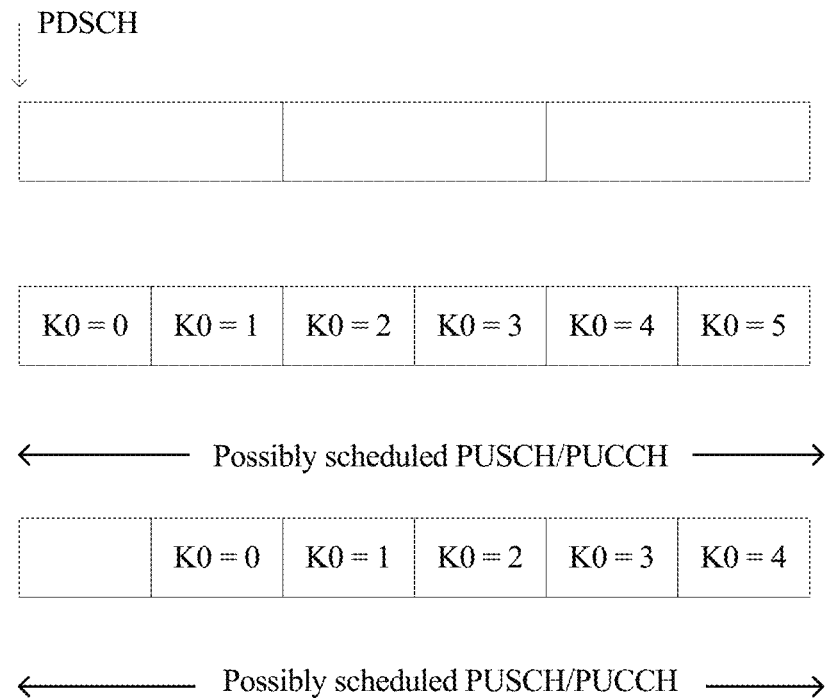
FIG. 10 shows an example diagram of an embodiment according to this application.

FIG. 10 shows an example diagram according to an embodiment of this application.

In this embodiment, a PDSCH is used to transmit downlink data, a PUSCH or a PUCCH is used to transmit control information, and a time unit used to transmit data is greater than a time unit used to transmit control information. As shown in FIG. 10, the time unit used to transmit data is aligned with two time units used to transmit control information. In this embodiment, a shorter time unit is used as a basic time unit for determining a time sequence K1, and the shorter time unit in this embodiment is a time unit used to transmit the control information.

Optionally, if a distance between a first time unit used by the possibly scheduled PUSCH or PUCCH and the time unit used to transmit data is less than 1, K1 of the first time unit is 1, and K1 of a subsequent time unit is successively increased by 1.

Optionally, if a distance between a second time unit used by the possibly scheduled PUSCH or PUCCH and the time unit used to transmit data is less than 1, K1 of the first time unit is 1, and K1 of a subsequent time unit is successively increased by 1.

Figure 11:
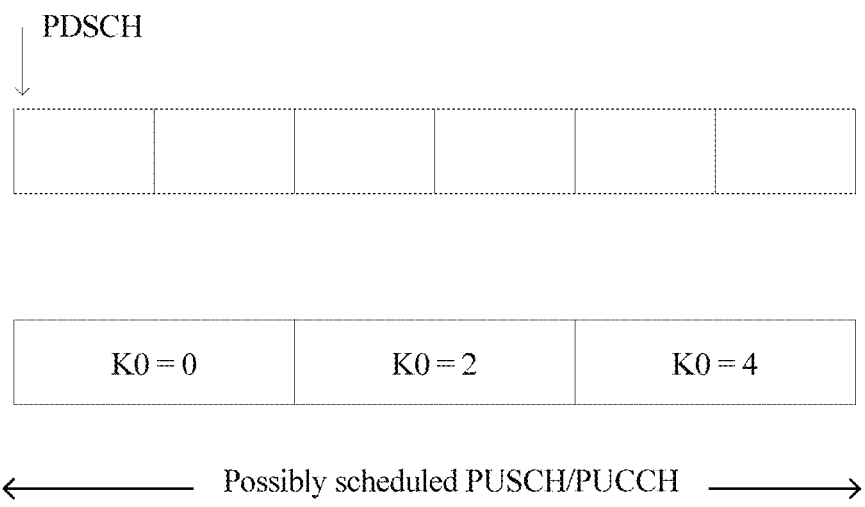
FIG. 11 shows an example diagram of an embodiment according to this application.

FIG. 11 shows an example diagram according to an embodiment of this application.

In this embodiment, a PDSCH is used to transmit downlink data, a PUSCH or a PUCCH is used to transmit control information, and a time unit used to transmit data is less than a time unit used to transmit control information. Specifically, as shown in FIG. 11, two time units used to transmit data are aligned with the time unit used to transmit control information. In this embodiment of this application, a shorter time unit is used as a basic time unit for determining a time sequence K1. In this embodiment, the shorter time unit is the time unit used to transmit data.

As shown in FIG. 11, K1 of a first time unit used by the possibly scheduled PUSCH or PUCCH is 0, and K1 of a subsequent time unit is successively increased by 2.

Figure 12:
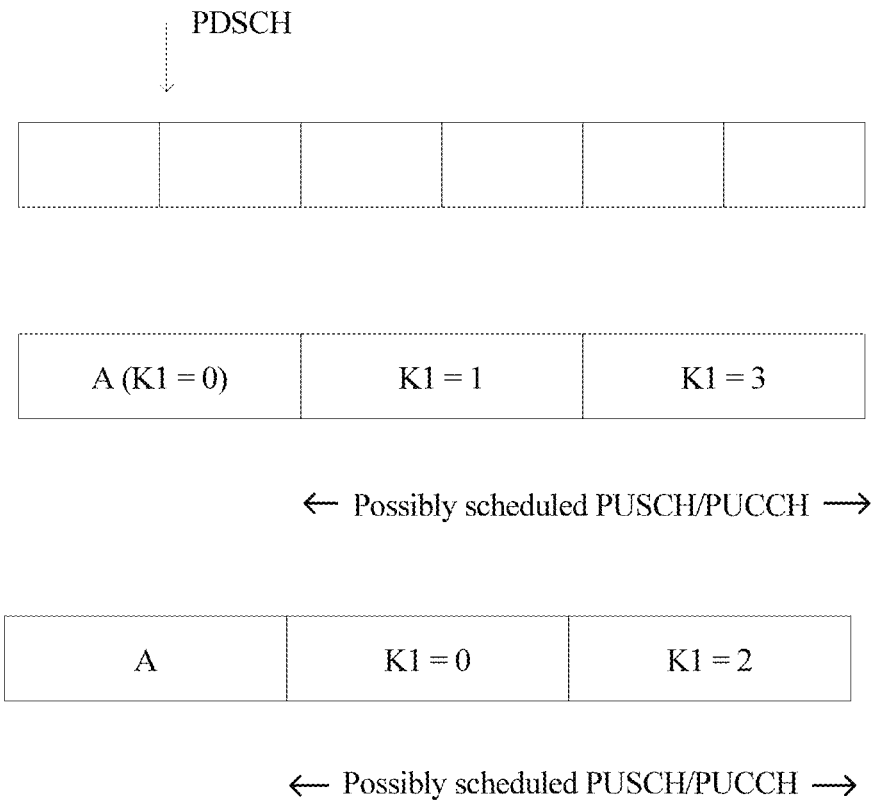
FIG. 12 shows an example diagram of an embodiment according to this application.

FIG. 12 shows an example diagram according to an embodiment of this application.

A difference between FIG. 12 and FIG. 11 is that a time unit used to transmit downlink data is already at a latter part of a time unit A used by a carrier 2. In this case, if a shorter time unit is used as a time unit for determining a time sequence, a time sequence K1 of the A time unit may be 0, a time sequence K1 of a first time unit after the A unit is 1, and K1 of a subsequent time unit is successively increased by 2; and the rest may be deduced by analogy; or a time sequence K1 of a first time unit after the A time unit is 0, and K1 of a subsequent time unit is successively increased by 2; and the rest may be deduced by analogy.

Figure 13:
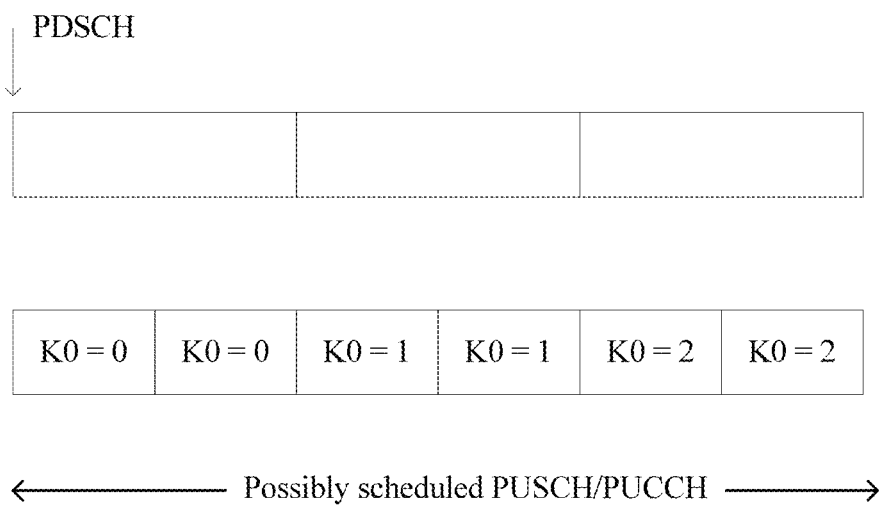
FIG. 13 shows an example diagram of an embodiment according to this application.

FIG. 13 shows an example diagram according to an embodiment of this application.

In this embodiment, a PDSCH is used to transmit downlink data, a PUSCH or a PUCCH is used to transmit control information. A time unit used to transmit data is greater than a time unit used to transmit control information. As shown in FIG. 13, the time unit used to transmit data is aligned with two time units used to transmit control information.

In this embodiment, a longer time unit is used as a basic time unit for determining a time sequence K1. In this embodiment, the longer time unit is the time unit used to transmit data. An interval between a first time unit and a second time unit that may transmit a PUSCH or a PUCCH and a time unit used to transmit downlink data is less than one longer time unit. In this case, K1 of the first time unit and the second time unit is 1. An interval between a third time unit and the time unit used to transmit downlink data is one longer time unit, and an interval between a fourth time unit and the time unit used to transmit downlink data is less than two longer time units. In this case, K1 of the third time unit and the fourth time unit is 2; and the rest may be deduced by analogy.

Figure 14:
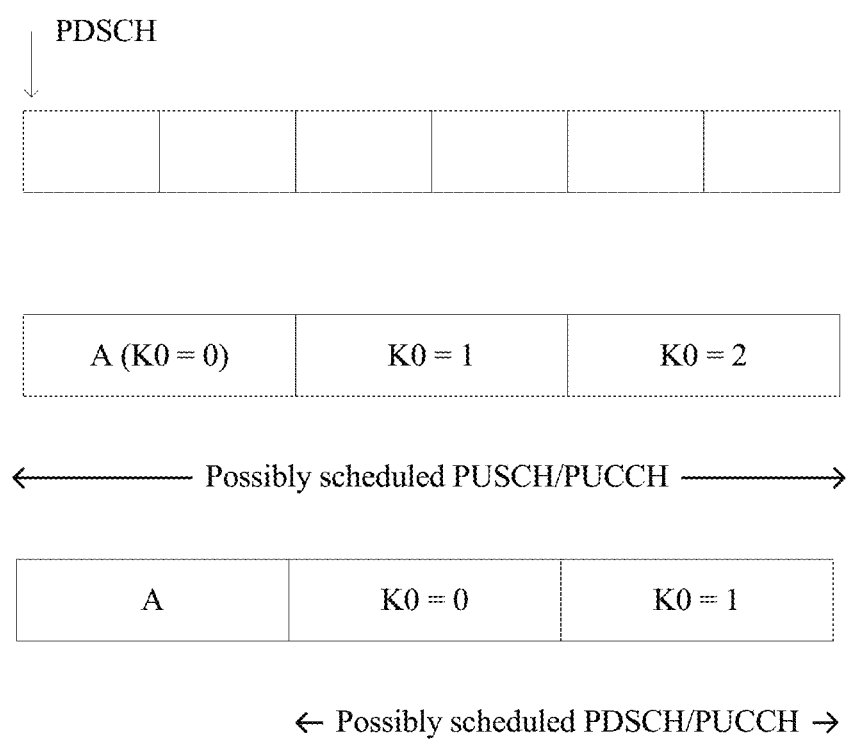
FIG. 14 shows an example diagram of an embodiment according to this application.

FIG. 14 shows an example diagram of an embodiment according to this application.

In this embodiment, a PDSCH is used to transmit downlink data, a PUSCH or a PUCCH is used to transmit control information, and a time unit used to transmit data is less than a time unit used to transmit control information. Specifically, as shown in FIG. 11, two time units used to transmit data are aligned with the time unit used to transmit control information. In this embodiment of this application, a longer time unit is used as a basic time unit, that is, the time unit used to transmit control information is used as a basic time unit.

Optionally, an interval between a time unit A and a time unit used to transmit the PDSCH is less than a longer time interval, K1 of A may be 0, and K1 of a subsequent time unit is successively increased by 1; and the rest may be deduced by analogy.

Alternatively, K1 of a first time unit after a time unit A is 0, and K1 of a subsequent time unit is successively increased by 1; and the rest may be deduced by analogy.

Figure 15:
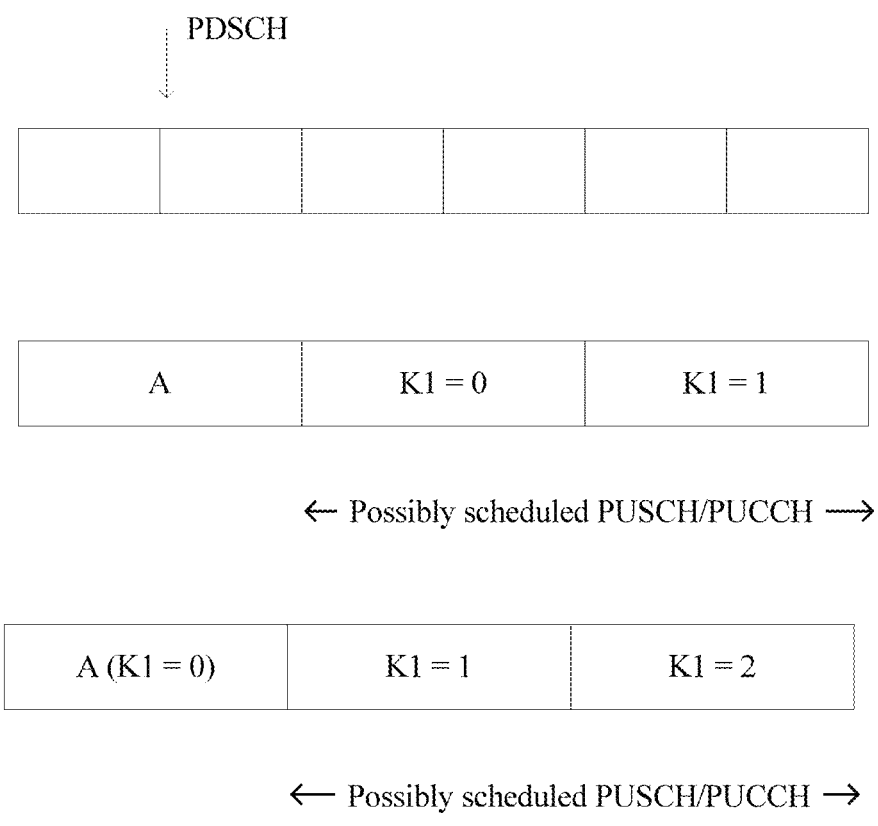
FIG. 15 shows an example diagram of an embodiment according to this application.

FIG. 15 shows an example diagram of an embodiment according to this application.

A difference between FIG. 15 and FIG. 14 is that a time unit used to transmit downlink data is already at a latter part of a time unit A used by a carrier 2. In this case, a longer time unit is used as a time unit for determining a time sequence.

Because a distance between a first time unit after the time unit A and a time unit used to transmit a PDSCH is less than one longer time unit, K1 is the first time unit after A is 0, and then K1 is successively increased by 1.

Alternatively, K1 of the time unit A is 0, and then K1 is successively increased by 1.

This application further provides an embodiment, and a target time unit is used as a basic time unit for determining a time sequence. For example, for K0 (a time relationship between a PDCCH and a PDSCH), the time unit used to transmit the PDSCH is used as a timing criterion or a timing unit; for K2 (a time relationship between a PDCCH and a PUSCH), a time unit used to transmit the PUSCH is used as a timing criterion or a timing unit; and for K1 (a time relationship between a PDSCH and a PUSCH/PUCCH), a time unit used to transmit the PUSCH/PUCCH is used as a timing criterion or a timing unit. That is, in the embodiments in FIG. 4 to FIG. 9, the time unit used to transmit the PDSCH is used as a basic time unit, and in the embodiments in FIG. 10 to FIG. 15, the time unit used to transmit the PUSCH or the PUCCH is used as a basic time unit.

This application further provides an embodiment, and a source time unit is used as a basic time unit for determining a time sequence. For example, for K0 (a time relationship between a PDCCH and a PDSCH), the time unit used to transmit the PDCCH is used as a timing criterion or a timing unit; for K2 (a time relationship between a PDCCH and a PUSCH), a time unit used to transmit the PDCCH is used as a timing criterion or a timing unit; and for K1 (a time relationship between a PDSCH and a PUSCH/PUCCH), a time unit used to transmit the PDSCH is used as a timing criterion or a timing unit. That is, in the embodiments in FIG. 4 to FIG. 9, the time unit used to transmit the PDCCH is used as a basic time unit, and in the embodiments in FIG. 10 to FIG. 15, the time unit used to transmit the PDSCH is used as a basic time unit.

This application further provides an embodiment, and a time unit used to transmit data is used as a basic time unit for determining a time sequence. For example, for K0 (a time relationship between a PDCCH and a PDSCH), the time unit used to transmit the PDCCH is used as a timing criterion or a timing unit; and for K1 (a time relationship between a PDSCH and a corresponding PUSCH or PUCCH), a time unit used to transmit the PDSCH is used as a timing criterion or a timing unit. That is, in the embodiments in FIG. 4 to FIG. 9, the time unit used to transmit the PDCCH is used as a basic time unit. If the time unit used to transmit a control channel PDCCH<the time unit used to transmit a data channel PDSCH, using the time unit (a longer time unit) of the data channel as a timing criterion or a timing unit has lower indication overheads than using the time unit (a shorter time unit) of the control channel as a timing criterion or a timing unit. Because it is assumed that M shorter time units are aligned with one longer time unit, and intervals K0 between the M shorter time units and a same longer time unit are equal (Note: If the shorter time unit is used for timing, values of K0 are not equal. It is assumed that an interval between a first shorter time unit and a longer time unit is K0=x shorter time units. In this case, an interval between a second shorter time unit and the longer time unit is K0=x+1 shorter time units, an interval between an $M^{th}$ shorter time unit and the longer time unit is K0=x+M shorter time units, and in the following description, a size of a K0 set required is large and a required quantity of bits of a DCI indication field is large). In addition, compared with a value of using the time unit (a shorter time unit) of the control channel as a timing criterion or a timing unit, a K0 value is smaller, a K0 value is relatively small; and when an indication absolute time range is given, a value fluctuation of K0 is relatively small (in this way, in the following description, a size of a K0 set is small and a quantity of bits of a DCI indication field is also small). If the time unit used to transmit a control channel PDCCH>the time unit used to transmit a data channel PDSCH, using the time unit (a shorter time unit) of the data channel as a timing criterion or a timing unit has a smaller scheduling latency than using the time unit (a longer time unit) of the control channel as a timing criterion or a timing unit, for example, K0=2. If the time unit of the data channel is used, a scheduling latency is two shorter time units; or if the time unit of the control channel is used, a scheduling latency is two longer time units. Further, K1 may use the same timing criteria as K0 to simplify a system design. The time unit of data transmission is used as a basic time unit. This may be understood as a time relationship determined after the time unit used to transmit the PDCCH is replaced with the time unit used to transmit the PDSCH. Further, for K2 (a time relationship between a PDCCH and a PUSCH), the time unit for transmitting the PUSCH is used as a timing criterion or a timing unit. In the embodiments in FIG. 10 to FIG. 15, the time unit used to transmit the PUSCH is used as a basic time unit.

The foregoing embodiment of this application provides a time sequence determining method. This application subsequently describes a time sequence communication procedure between a base station and a terminal. For determining of a time sequence and other related content, reference may be made to the description in the foregoing embodiment.

Figure 16:
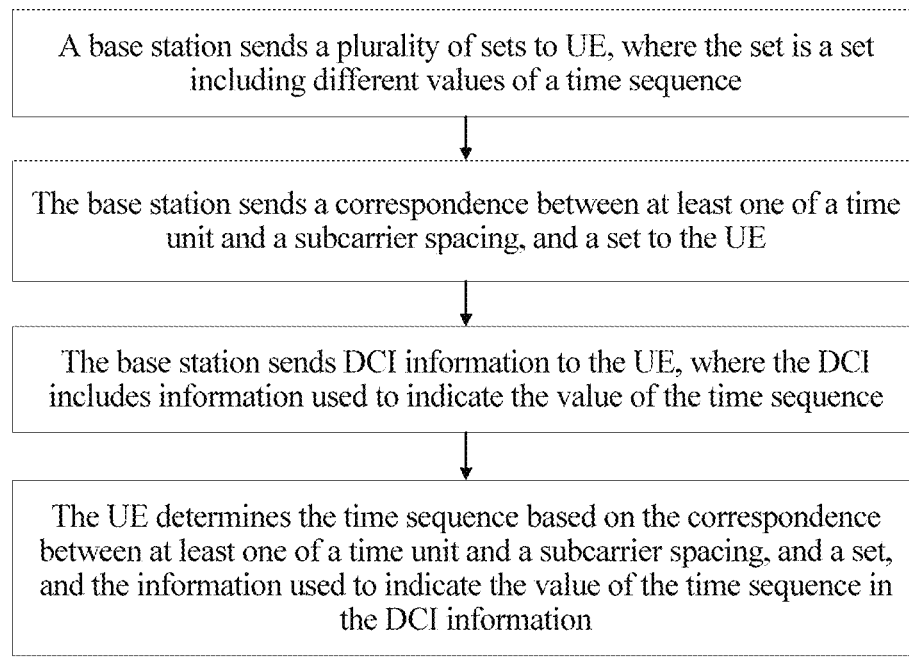
FIG. 16 shows a schematic flowchart of an embodiment according to this application.

As shown in FIG. 16, this application provides a schematic flowchart of an embodiment.

S1601. A base station sends a plurality of sets to UE, where the set is a set including different values of a time sequence.

Optionally, the plurality of sets include one K0 set, one K1 set, one K2 set, or the plurality of sets include at least two K0 sets, and/or at least two K1 sets, and/or at least two K2 sets.

In an example, the plurality of sets may include a set of K0 (a K0 set for short), and the K0 set may be {1, 2}; the plurality of sets may further include a set of K1 (a K1 set for short), and the K1 set may be {3, 4}; and the plurality of sets may further include a set of K2 (a K2 set for short), and the K2 set may be {5, 6}.

The base station may send the foregoing plurality of sets to the UE by using higher layer signaling, for example, the sets are sent by using RRC signaling. The plurality of sets are sent by using radio resource control (RRC) configuration or a master information block (MIB) message, a system information block (SIB) message, or radio resource control (RRC) signaling, or Media Access Control-control element (MAC CE) signaling. Different sets may have a correspondence with different time units or different subcarrier spacings, or have a correspondence with different time units and different subcarrier spacings.

Alternatively, different sets may have a correspondence with different time unit intervals or different subcarrier spacings.

Alternatively, different sets may have a correspondence with different subcarrier spacing pairs, or different sets may have a correspondence with different time unit pairs, for example, a (15 kHz, 60 kHz) pair is corresponding to a set 1 of K1, and a (15 kHz, 120 kHz) pair is corresponding to a set 2 of K1.

S1602. The base station sends a correspondence between at least one of a time unit and a subcarrier spacing, and a set to the UE.

Optionally, the relationship may be a correspondence between a subcarrier spacing 15 kHz and a set 1, or a correspondence between a time unit with seven symbols and a set 1, or a correspondence between a subcarrier spacing 15 kHz, a time unit with seven symbols, and a set 1.

The correspondence may be understood as a correspondence between different sets and different time units, a correspondence between different sets and different subcarrier spacings, or both; or a correspondence between different sets and different time unit intervals, or a correspondence between different sets and different subcarrier intervals; or a correspondence between different subcarrier spacing/time unit length pairs (pair) and different time sequence sets. For example, a K1 set 1 is configured for 15 k_to_30 k, and a K1 set 1 is configured for 30 k_to_15 k. When a PDSCH is 15 k and a decoding result is fed back on a PUSCH/PUCCH that is 30 k, a K1 value indicated in DCI is from the set 1. Similarly, when the PDSCH is 30 k and the decoding result is fed back on the PUSCH/PUCCH that is 15 k, a K1 value indicated in the DCI is from the set 2.

The base station may send the foregoing plurality of correspondences to the UE. The base station may send the foregoing correspondences to the UE by using the higher layer signaling.

Therefore, different subcarrier spacings or time units are corresponding to different processing latencies. This may save DCI signaling overheads.

S1603. The base station sends DCI information to the UE, where the DCI includes information used to indicate the value of the time sequence.

Optionally, downlink data scheduling DCI includes a first indication field used to indicate K0 value information, and a second indication field used to indicate K1 value information.

Uplink data scheduling DCI includes a third indication field used to indicate K2 value information.

In an example, the foregoing value information indicates a specific value in the foregoing set. For example, the K0 set is {2, 4, 5, 6}, and value information indicated by the first indication field is 2. This indicates that a value of K0 is a second value in the set, that is, K0=4.

In an implementation, a quantity of bits of the first indication field, a quantity of bits of the second indication field, and a quantity of bits of the third indication field are equal, for example, 2 bits. In this case, flexibility of the first indication field, the second indication field, and the third indication field is the same, that is, sets are of a same size.

In another implementation, a sum of the quantity of bits of the first indication field and the quantity of bits of the second indication field is equal to the quantity of bits of the third indication field, for example, the quantity of bits of the first indication field is 1, the quantity of bits of the second indication field is 1, and the quantity of bits of the third indication field is 2. This may ensure that overheads or sizes of uplink DCI and downlink DCI are similar or the same.

Optionally, the solution of S1603 may not be combined with S1601 and S1602. This is not limited in this application.

For different UEs, and different subcarrier spacings, quantities of symbols and time units, minimum K1 and K2 required by the UE are different. For example, for UE, if a slot with 15 k is used as a time unit, K1 of the UE may be 1. However, if a slot with 60 k is used as a time unit, K1 of the UE needs to be at least 4. For example, a set required by 15 k is {1, 2}, and a set required by 60 k is {4, 5}.

If only one set is configured, {1, 2, 4, 5} needs to be configured. A time sequence field in the DCI needs to include 2 bits. In this solution, two sets are used. In this case, the time sequence field in the DCI needs to include only 1 bit. Therefore, DCI overheads may be reduced based on the solution of this application.

S1604. The UE determines the time sequence based on the correspondence between at least one of a time unit and a subcarrier spacing, and a set, and the information used to indicate the value of the time sequence in the DCI information.

Because a plurality of K1 sets may be configured, the UE needs to determine a set, and then determine a specific value of K1 based on indication information of the second indication field in the DCI. Specifically, the UE determines a set based on a currently configured subcarrier spacing (or a time unit), and the correspondences between the subcarrier spacings (or the time units) and the plurality of sets in S1601.

The following example describes how to determine a specific value of K1. A manner for describing specific values of K0 and K2 are similar to a manner for describing the specific value of K1, and details are not described again.

If one subcarrier spacing (or a time unit length) value is corresponding to one K1 set, for example, 15 kHz (or 1 ms) is corresponding to the K1 set 1, and 60 kHz (or 0.25 ms) is corresponding to the K1 set 2, in an implementation, the UE determines a K1 set based on a subcarrier spacing (or a time unit length) value of the PDSCH, for example, if a subcarrier spacing of the PDSCH is 15 kHz, the K1 set 1 is determined, and then determines a final value of K1 based on the indication information of the second indication field in the DCI and the K1 set 1.

In another implementation, the UE determines a K1 set based on a subcarrier spacing (or a time unit length) value of the PUSCH/PUCCH, for example, if a subcarrier spacing of the PUSCH/PUCCH is 60 kHz, the K1 set 2 is determined, and then determines a final value of K1 based on the indication information of the second indication field in the DCI and the K1 set 2.

If one subcarrier spacing (or a time unit length) value is corresponding to one K1 set, for example, 15 kHz to 60 kHz (or 0.25 ms to 1 ms) are corresponding to the K1 set 1, and 120 kHz to 240 kHz are corresponding to the K1 set 2, in an implementation, the UE determines a K1 set based on a subcarrier spacing (or a time unit length) value of the PDSCH, for example, if a subcarrier spacing of the PDSCH is 15 kHz, the K1 set 1 is determined, and then determines a final value of K1 based on the indication information of the second indication field in the DCI and the K1 set 1.

In another implementation, the UE determines a K1 set based on a subcarrier spacing (or a time unit length) value of the PUSCH/PUCCH, for example, if a subcarrier spacing of the PUSCH/PUCCH is 60 kHz, the K1 set 1 is determined, and then determines a final value of K1 based on the indication information of the second indication field in the DCI and the K1 set 1.

If one subcarrier spacing pair or subcarrier spacing interval pair (or one time unit length pair or time unit length interval pair) value is corresponding to one K1 set, for example, one (15 kHz, 60 kHz) pair is corresponding to one K1 set 1; and one (15 kHz, 120 kHz) pair is corresponding to one K1 set 2, in an implementation, the UE determines a K1 set based on a subcarrier spacing (or a time unit length) value of the PDSCH and a subcarrier spacing (or a time unit length) value of the PUSCH/PUCCH, for example, if a subcarrier spacing of the PDSCH is 15 kHz, and a subcarrier spacing of the PUSCH/PUCCH is 60 kHz, the K1 set 1 is determined, and then determines a final value of K1 based on the indication information of the second indication field in the DCI and the K1 set 1; or if a subcarrier spacing of the PDSCH is 15 kHz, and a subcarrier spacing of the PUSCH/PUCCH is 120 kHz, the K1 set 1 is determined, and then determines a final value of K1 based on the indication information of the second indication field in the DCI and the K1 set 2.

For example, the base station carries scheduling information by using a carrier 1, and performs corresponding data transmission by using a carrier 2. If a carrier spacing of the carrier 2 is 15 kHz, a quantity of time units between a time unit used for information scheduling and a time unit used for data transmission is a set 1, where the set 1 may include a plurality of different values, for example, may be {1, 2}. If a carrier spacing of the carrier 2 is 30 kHz, a quantity of time units between a time unit used for information scheduling and a time unit used for data transmission is a set 2, where the set 2 may include a plurality of different values, for example, may be {3, 4}. The base station may send a correspondence between the set 1 and 15 kHz and a correspondence between the set 2 and 30 kHz to the UE. Further, the base station sends indication information to the UE. The indication information is used to indicate a quantity of time units between the time unit used for information scheduling and the time unit used for data transmission. The indication information may be included in downlink scheduling information such as the DCI. If the indication information indicates a second value, the UE determines the set 1 based on the carrier spacing that is of the carrier 2 and that is 15 kHz. In this case, the second value is 2 in the set 1, that is, the quantity of time units between the time unit used for information scheduling and the time unit used for data transmission is 2.

For example, the base station carries scheduling information by using a carrier 1, and performs corresponding data transmission by using a carrier 2. If a UE capability is considered, for UE, if a carrier interval of the carrier 2 is 15 kHz and a time unit length is 14 symbols, a quantity of time units between a time unit used for scheduling information and a time unit used for data information may be 1. If a carrier interval of the carrier 2 is 60 kHz and a time unit length is 7 symbols, a quantity of time units between a time unit used for scheduling information and a time unit used for data information is at least 4. In this case, the base station may send the following to the UE: a set 1 and a set 2; a correspondence between the set 1 and the carrier spacing, a correspondence between the set 1 and the time unit length, or both; and a correspondence between the set 2 and the carrier spacing, a correspondence between the set 2 and the time unit length, or both. For example, the set 1 is {1, 2}, and is corresponding to a carrier spacing that is 15 kHz, and a time unit length that is 14 symbols; and the set 2 is {4, 5}, and is corresponding to a carrier spacing that is 60 kHz, and a time unit length that is 7 symbols. Further, the base station sends indication information to the UE. The indication information is used to indicate a quantity of time units between the time unit used for information scheduling and the time unit used for data transmission. If a carrier spacing of the carrier 2 that is used to perform corresponding data transmission is 15 kHz, and a time unit length is 14 symbols, the UE determines the set 1 based on the carrier spacing that is used in data transmission and that is 15 kHz, and a time unit length that is 14 symbols; and determines, based on a second value indicated in the indication information, that the quantity of time units between the time unit used for information scheduling and the time unit used for data transmission is 2.

For example, the base station performs data transmission by using a carrier 1. The UE feeds back confirmation information by using a carrier 2, that is, a decoding result. If a carrier spacing of the carrier 1 is 15 kHz, and a carrier spacing of the carrier 2 is 30 kHz, if the carrier with 15 kHz schedules the carrier with 30 kHz, the base station configures the set 1, where the set 1 is {1, 2}. If a carrier spacing of the carrier 1 is 30 kHz, and a carrier spacing of the carrier 2 is 15 kHz, the base station configures the set 2, where the set 2 is {3, 4}. The base station sends the set 1 and the set 2 to the user equipment. Further, the base station sends indication information to the UE. The UE determines the set 1 based on the carrier spacing that is of the carrier that is used to perform data transmission and that is 15 kHz, and the carrier spacing that is of the carrier that is used to feed back confirmation information and that is 30 kHz; and determines, based on a second value indicated in the indication information, 2 in the set 1, that is, determines a quantity of time units between a time unit that feeds back the confirmation information and a time unit used for data transmission is 2.

Therefore, a plurality of sets corresponding to different subcarrier spacings or time units are sent, and the DCI is notified to indicate a time sequence value, so that flexible scheduling in a scenario of different subcarrier spacings or time units can be implemented, thereby reducing signaling overheads.

This application provides an embodiment, and the embodiment relates to cross-carrier scheduling of different time unit lengths.

Figure 17:
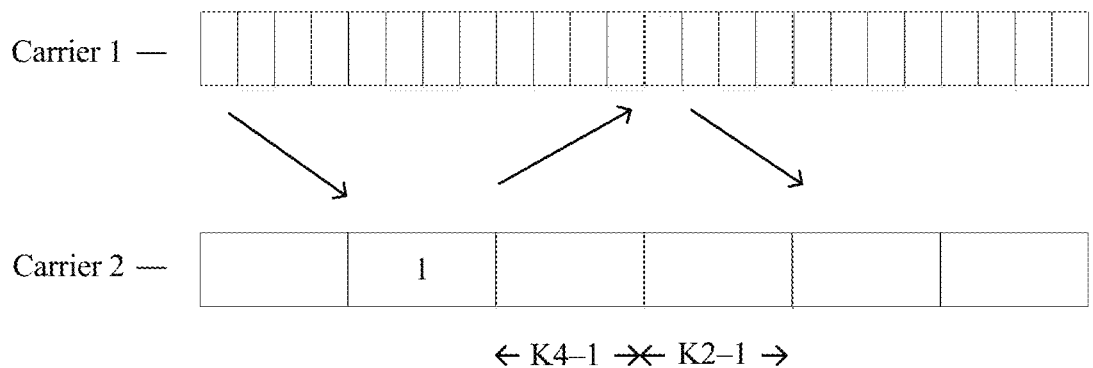
FIG. 17 shows an example diagram of an embodiment according to this application.

FIG. 17 shows an example diagram of an embodiment of this application.

In the embodiment shown in FIG. 17, a base station configures a plurality of carriers for UE, for example, the carrier 1 and the carrier 2 in FIG. 16. The carrier 1 may perform cross-carrier scheduling on a PDSCH or a PUSCH of the carrier 2. A time unit used by the carrier 1 is less than a time unit used by the carrier 2.

If the time unit of the carrier 1 is the same as that of the carrier 2, if K2=2 and K4=2, a quantity of processes required to ensure continuous transmission is 4.

If the time unit used by the carrier 1 is less than the time unit of the carrier 2, a shorter time unit schedules a longer time unit, and K2+K4 processes can ensure continuous transmission.

Figure 18:
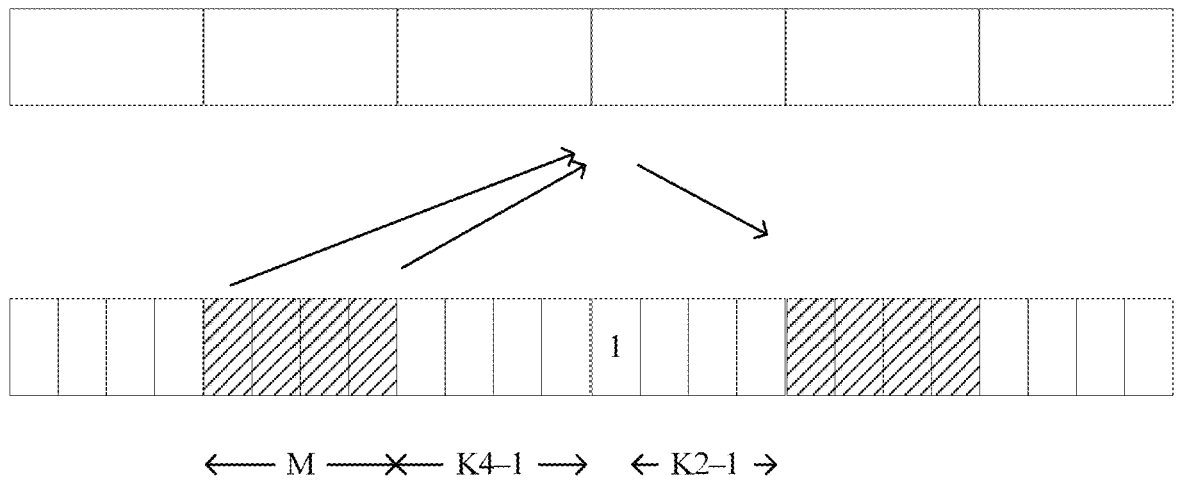
FIG. 18 shows an example diagram of an embodiment according to this application.

FIG. 18 shows an example diagram of an embodiment of this application.

In the embodiment shown in FIG. 18, a carrier 1 performs cross-carrier scheduling on a PDSCH or a PUCCH of a carrier 2. A time unit used by the carrier 1 is one quarter of a time unit used by the carrier 2.

If the time unit of the carrier 1 is the same as that of the carrier 2, if K2=4 and K4=4, a quantity of processes required to ensure continuous transmission is 8.

If the time unit used by the carrier 2 is four times the time unit used by the carrier 1, to ensure continuous transmission, M−1+K2+K4 processes are required, where M is a ratio of a longer time unit to a shorter time unit.

Therefore, this embodiment of this application provides a solution, and a length of a time unit for transmitting a PDCCH is not greater than a time unit length for transmitting a PUSCH or a PDSCH, so as to avoid increasing a quantity of processes required for continuous transmission.

In an embodiment of this application, if the PDCCH and the PUSCH or the PDSCH are configured on one slot slot, a subcarrier spacing for transmitting the PDCCH is not less than a subcarrier spacing for transmitting the PUSCH or the PDSCH. That is, if a quantity of slots or a quantity of symbols is the same, a subcarrier spacing is limited, for example, the subcarrier spacing for transmitting the PDCCH is not less than a subcarrier spacing for transmitting the PUSCH or the PDSCH.

Details are shown in the table below.

| Subcarrier spacing used by a PDCCH | Subcarrier spacing allowed by a PUSCH/PDSCH |
|---|---|
| 240k | 15k, 30k, 60k, 120k, 240k |
| 120k | 15k, 30k, 60k, 120k |
| 60k | 15k, 30k, 60k |
| 30k | 15k, 30k |
| 15k | 15k |

In an embodiment of this application, if a subcarrier spacing and a time unit that are configured by the PDCCH are 60 kHz and one slot respectively, configuration of the PUSCH or the PDSCH needs to ensure that a time unit length of the PUSCH or the PDSCH is not less than a time unit length of the PDCCH, for example, a subcarrier spacing may be 15K, 30K, 60K, or 120K, and a time unit is two slots. That is, if a quantity of slots or a quantity of symbols is different, the subcarrier spacing, the quantity of slots or the quantity of symbols may be combined for consideration; and at least one of the quantity of symbols or the quantity of slots, and the subcarrier spacing can determine a time unit length.

Details are shown in the table below.

| Used by a PDCCH (Subcarrier spacing, quantity of slots) | Configuration allowed by a PUSCH/PDSCH (Subcarrier spacing, quantity of slots) |
|---|---|
| (240k, 1) | (15k, >=1), (30k, >=1), (60k, >=1), (120k, >=1), (240k, >=1) |
| (120k, 1) | (15k, >=1), (30k, >=1), (60k, >=1), (120k, >=1), (240k, >=2) |
| (60k, 1) | (15k, >=1), (30k, >=1), (60k, >=1), (120k, >=2), (240k, >=4) |
| (30k, 1) | (15k, >=1), (30k, >=1), (60k, >=2), (120k, >=4), (240k, >=8) |
| (15k, 1) | (15k, >=1), (30k, >=2), (60k, >=4), (120k, >=8), (240k, >=16) |

In an embodiment provided in this application, a length of a time unit for transmitting a PDCCH may be greater than a length of a time unit for transmitting a PUSCH or a PDSCH. To avoid an excessive increase in a quantity of processes required to ensure continuous transmission, the length of a time unit for transmitting a PDCCH is configured to be greater than the length of a time unit for transmitting a PUSCH or a PDSCH, and the length of a time unit for transmitting a PUSCH or a PDSCH is greater than 1/X of the length of a time unit for transmitting a PDCCH, where X is a positive integer. Optionally, X may be 2 or 4.

If X=2, and the PDCCH and the PUSCH or the PDSCH are configured on one slot, the subcarrier spacing of the PUSCH or the PDSCH is not greater than 120 kHz if the subcarrier spacing of the PDCCH is 60 kHz.

Details are shown in the table below.

| Subcarrier spacing used by a PDCCH | Subcarrier spacing allowed by a PUSCH/PDSCH |
|---|---|
| 240k | 15k, 30k, 60k, 120k, 240k |
| 120k | 15k, 30k, 60k, 120k, 240k |
| 60k | 15k, 30k, 60k, 120k |
| 30k | 15k, 30k, 60k |
| 15k | 15k, 30k |

Alternatively, if X=2, and the PDCCH is configured on one slot with 60 k, the time unit length of the PUSCH/PDSCH is configured to be not greater than the time unit length of the PDCCH, for example, a subcarrier spacing may be 15 k, 30 k, 60 k, 120 k, or 240 k, and a time unit is two slots. That is, if a quantity of slots and a quantity of symbols are different, the quantity of symbols or the quantity of slots, and the subcarrier spacing are combined to determine a time unit length.

Details are shown in the table below.

| Used by a PDCCH (Subcarrier spacing, quantity of slots) | Configuration allowed by a PUSCH/PDSCH (Subcarrier spacing, quantity of slots) |
|---|---|
| (240k, 1) | (15k, >=1), (30k, >=1), (60k, >=1), (120k, >=1), (240k, >=1) |
| (120k, 1) | (15k, >=1), (30k, >=1), (60k, >=1), (120k, >=1), (240k, >=1) |
| (60k, 1) | (15k, >=1), (30k, >=1), (60k, >=1), (120k, >=1), (240k, >=2) |
| (30k, 1) | (15k, >=1), (30k, >=1), (60k, >=1), (120k, >=2), (240k, >=4) |
| (15k, 1) | (15k, >=1), (30k, >=1), (60k, >=2), (120k, >=4), (240k, >=8) |

Further, a value of M is related to a capability of UE and a maximum quantity of processes supported by a system or the UE. In an example of this application, configuration of M needs to meet the following condition: A value of K2+K4 (herein, K2+K4 is a quantity of processes required if time unit lengths are the same)+M−1 is not greater than the maximum quantity of processes supported by the system (or supported by the UE). If the maximum quantity of processes herein is 16, and K2+K4=8, M is not greater than 9.

UE that supports smaller K2 and K4 may not support the following: The length of a time unit for transmitting a PDCCH is greater than the length of a time unit for transmitting a PUSCH or a PDSCH. Alternatively, a value of M is as small as possible, and may be 2. This is mainly based on consideration of "idle rate=(M−1)/(K2+K4+M−1)". Specifically, if K2=1, K4=1, and M=4, an idle rate is 3/5=60%. However, if K2=4, K4=4, and M=4, an idle rate is 3/11=27%.

This application provides an embodiment that relates to scheduling. A base station configures the PDCCH, and the corresponding PDSCH or PUSCH, where X>a ratio of the PDCCH to the PDSCH/PUSCH (the ratio may be a time unit length ratio or a subcarrier spacing ratio)>1/Y, and X and Y are positive integers. Optionally, both X and Y are equal to 2 or 4. Alternatively, a base station configures the PDCCH, and the corresponding PDSCH or PUSCH, and subcarrier spacings of the PDCCH, and the corresponding PDSCH or PUSCH are subcarrier spacings supported by the UE, for example, if the UE supports 15 kHz, 60 kHz, and 120 kHz, the PDCCH, and the corresponding PDSCH or PUSCH are configured as an adjacent combination including 15 and 60 or an adjacent combination including 60 and 120. When the base station classifies carriers, a maximum of one group of carriers has different subcarrier spacings or time unit lengths, for example, 10 carriers are classified into four groups. Grouping is performed based on whether the subcarrier spacings or the time unit lengths are the same. Remaining different subcarrier spacings or time unit lengths are classified into one group. Alternatively, when the base station classifies carriers, a maximum of two groups of carriers have different subcarrier spacings or time unit lengths.

This application provides an embodiment, and the embodiment relates to HARQ feedback on different time unit lengths.

Figure 19:
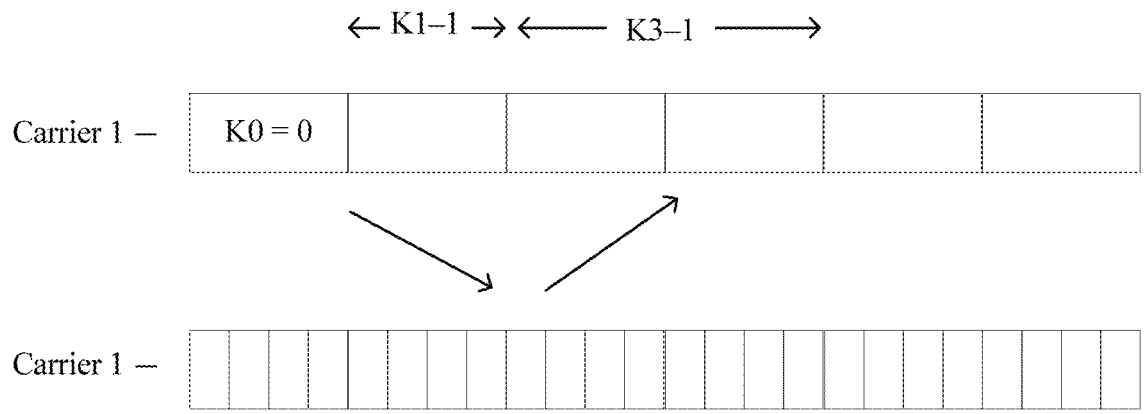
FIG. 19 shows an example diagram of an embodiment according to this application.

FIG. 19 shows an example diagram of an embodiment according to this application.

As shown in FIG. 19, a base station configures a plurality of carriers for UE, for example, the carrier 1 and the carrier 2 in FIG. 18. A length of a time unit used by the carrier 1 is four times a length of a time unit used by the carrier 2.

As shown in FIG. 19, data is transmitted on a carrier of a longer time unit, and confirmation information is fed back on a carrier of a shorter time unit, for example, an acknowledgement ACK message or a negative acknowledgement NACK message.

If the time unit length of the carrier 1 is the same as that of the carrier 2, a quantity of required processes is K1+K3+K0. If K0=0, K1=2, and K3=2, a quantity of required processes is 4. If the length of a time unit of the carrier 1 is greater than the length of a time unit of the carrier 2, as shown in FIG. 19, a quantity of required processes is still 4.

Figure 20:
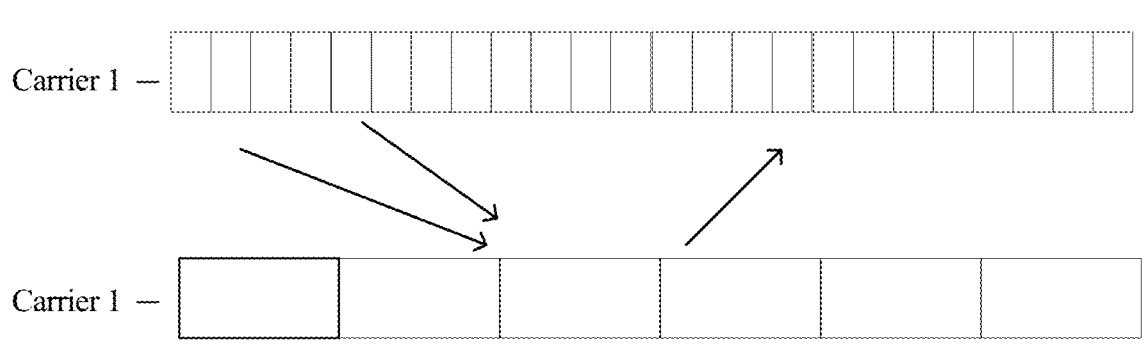
FIG. 20 shows an example diagram of an embodiment according to this application.

FIG. 20 shows an example diagram of an embodiment according to this application.

As shown in FIG. 20, a base station configures a plurality of carriers for UE, for example, the carrier 1 and the carrier 2 in FIG. 19. A length of a time unit used by the carrier 1 is one quarter of a length of a time unit used by the carrier 2.

As shown in FIG. 20, data is transmitted on a carrier of a shorter time unit, and confirmation information is fed back on a carrier of a longer time unit. This may increase a quantity of processes required to ensure continuous transmission.

If the time unit length of the carrier 1 is the same as that of the carrier 2, a quantity of required processes is K1+K3+K0. If K0=0, K1=4, and K3=4, a quantity of required processes is 8.

As shown in FIG. 20, if the length of a time unit used by the carrier 1 is one quarter of the length of a time unit used by the carrier 2, and a quantity of required processes is K1+K3+K0+2M−2, that is, 16. M is a ratio of the longer time unit to the shorter time unit, and is 4 herein.

Therefore, a solution provided in this application is that a time unit length for transmitting a PDSCH is configured to be not less than a time unit length for transmitting a PUSCH or a PUCCH.

In an example provided in this application, if a time unit for transmitting the PDSCH and a time unit for transmitting the PUSCH or the PUCCH are both configured to be one slot, a subcarrier spacing needs to meet the following condition: If a subcarrier spacing of the PDSCH is 30 k, a subcarrier spacing of the PUSCH or the PDSCH needs to be greater than or equal to 30 k, for example, 30 k, 60 k, 120 k, or 240 k. (If a quantity of slots and a quantity of symbols are the same, only the subcarrier spacing is considered. The quantity of slots, the quantity of symbols, and the subcarrier spacing jointly determine the time unit length. More examples are shown in the table below.)

Details are shown in the table below.

| Used by a PDSCH (Subcarrier spacing, quantity of slots) | Subcarrier spacing allowed by a PUSCH/PUCCH |
| --- | --- |
| 240k | 240k |
| 120k | 120k, 240k |
| 60k | 60k, 120k, 240k |
| 30k | 30k, 60k, 120k, 240k |
| 15k | 15k, 30k, 60k, 120k, 240k |

In an example provided in this application, if the PDCCH is configured on one slot with 60 kHz, configuration of the PUSCH or the PUCCH needs to meet the following condition: A time unit length of the PUSCH or the PUCCH is less than or equal to a time unit length of the PDCCH, for example, a subcarrier spacing may be 60 k, 120 k, or 240 k. (If a quantity of slots and a quantity of symbols are different, the quantity of symbols or the quantity of slots, and the subcarrier spacing are combined to determine a time unit length.)

Details are shown in the table below.

| (Subcarrier spacing, quantity of slots) used by a PDSCH | Configuration allowed by a PUSCH/PUCCH (Subcarrier spacing, quantity of slots) |
| --- | --- |
| (240k, 1) | (240k, 1) |
| (120k, 1) | (120k, 1), (240k, <=2) |
| (60k, 1) | (60k, 1), (120k, <=2), (240k, <=4) |
| (30k, 1) | (30k, 1), (60k, <=2), (120k, <=4), (240k, <=8) |
| (15k, 1) | (15k, 1), (30k, <=2), (60k, <=4), (120k, <=8), (240k, <=16) |

Optionally, in this application, a length of a time unit for transmitting a PDSCH may be configured to be less than a length of a time unit for transmitting a PUSCH or a PUCCH, and the length of a time unit of a PDSCH is 1/X greater than of the length of a time unit for transmitting a PUSCH or a PUCCH, where X is a positive integer. Further, X=2 or 4.

When X=2, if the PDSCH and the PUSCH or the PUCCH are configured to be on a slot with 14 symbols, a subcarrier spacing needs to meet the following condition: If a subcarrier spacing of the PDSCH is 30 k, a subcarrier spacing of the PUSCH/PUCCH needs to be greater than or equal to 30 k, for example, 15 k, 30 k, 60 k, 120 k, or 240 k.

Details are shown in the table below.

| Subcarrier spacing used by a PDSCH | Subcarrier spacing allowed by a PUSCH/PUCCH |
| --- | --- |
| 240k | 120k, 240k |
| 120k | 60k, 120k, 240k |
| 60k | 30k, 60k, 120k, 240k |
| 30k | 15k, 30k, 60k, 120k, 240k |
| 15k | 15k, 30k, 60k, 120k, 240k |

| Used by a PDSCH (Subcarrier spacing, quantity of slots) | Configuration allowed by a PUSCH/PUCCH (Subcarrier spacing, quantity of slots) |
| --- | --- |
| (240k, 1) | (120k, 1), (240k, <=2) |
| (120k, 1) | (60k, 1), (120k, <=2), (240k, <=4) |
| (60k, 1) | (30k, 1), (60k, <=2), (120k, <=4), (240k, <=8) |
| (30k, 1) | (15k, 1), (30k, <=2), (60k, <=4), (120k, <=8), (240k, <=16) |
| (15k, 1) | (15k, <=2), (30k, <=2), (60k, <=4), (120k, <=8), (240k, <=16) |

Further, selection of M is related to a capability of the UE (related to values of K1 and K3), and a maximum quantity of processes supported by a system or the UE.

Optionally, if M needs to meet the following condition: A value of K1+K3 (a quantity of processes required when time units are the same)+2M−2 is not greater than the maximum quantity of processes supported by the system (or the maximum quantity of processes supported by the UE), the maximum quantity of processes supported by the system or the UE may be 16. If K1+K3=8, M is not greater than 5.

Alternatively, the UE that supports smaller K1 and K3 does not support the following: The time unit length of the PDSCH is less than the time unit length of the PUSCH/PUCCH. Alternatively, a value of M is as small as possible, for example, 2. This is based on consideration of "idle rate=(2M−2)/(K1+K3+2M−2)". Specifically, if K1=1, K3=1, and M=4, an idle rate is 6/8=75%. However, if K1=4, K3=4, and M=4, an idle rate is 6/16=37.5%.

It should be noted that M is a ratio of a length of the longer time unit to a length of the shorter time unit (or a ratio of the time unit length of the PUSCH/PUCCH to the time unit length of the PDSCH).

In 5G, one time unit includes two PUCCH time divisions of same UE. Therefore, if two PUCCH time divisions exist, M may be divided by 2. In 5G, a quantity of symbols of one slot may be 7 symbols or 14 symbols, and 6 symbols or 12 symbols under an extended CP.

This application provides an embodiment that relates to feedback. The base station configures the PDSCH, and the corresponding PUCCH or PUSCH, where X>a ratio of the PDSCH to the PUCCH/PUSCH (the ratio may be a time unit length ratio or a subcarrier spacing ratio)>1/Y, and X and Y are positive integers. Optionally, both X and Y are equal to 2 or 4. The base station configures the PDSCH, and the corresponding PUCCH or PUSCH, and subcarrier spacings of the PDSCH, and the corresponding PUCCH or PUSCH are adjacent subcarrier spacings supported by the UE, for example, if the UE supports 15 k, 60 k, and 120 k, an adjacent combination including 15 and 60 or an adjacent combination including 15 and 120 is configured, but a combination including 15 and 120 cannot be configured. When the base station classifies the carriers, a maximum of one group includes carriers with different subcarrier spacings or time unit lengths, for example, 10 carriers are classified into four groups. Grouping is performed based on whether the subcarrier spacings or the time unit lengths are the same. Remaining different subcarrier spacings or time unit lengths are classified into one group. When the base station classifies the carriers, each group includes a maximum of two carriers with different subcarrier spacings or time unit lengths.

It should be noted that a number of a symbol sequence in this application, such as "first", "second", or the like, is only used for clarification and does not constitute a limitation. Symbol sequences with a same number in different embodiments may be the same or may be different. It may be understood that, to implement the foregoing functions, network elements, such as a network side device (for example, a base station) or UE, include corresponding hardware structures and/or software modules that are used to perform the functions. A person skilled in the art should easily be aware that, in combination with the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 21:
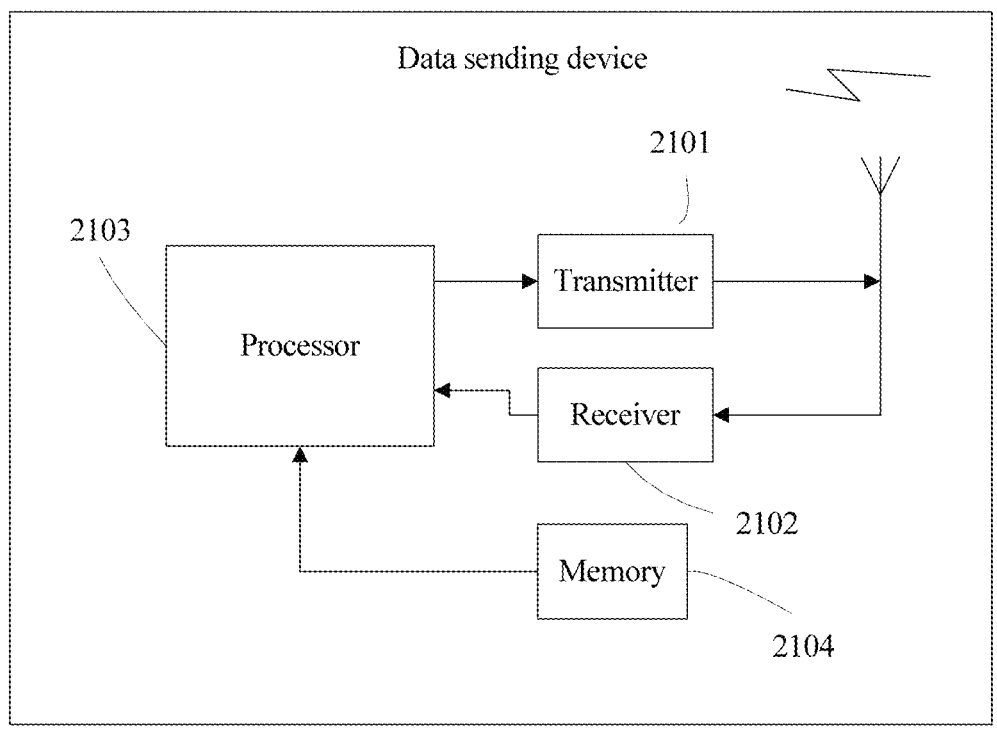
FIG. 21 shows a schematic structural diagram according to this application.

FIG. 21 shows a possible schematic structural diagram of a device in the foregoing embodiments. The device may be a network side device, for example, a base station, or may be user equipment UE. Related content such as corresponding functions or steps in the foregoing embodiments may be performed by using the device.

In a specific example, the device includes a processor and a transmitter. In a specific example, a structure of the device may further include a receiver. In a specific example, when the device is the network side device, a structure of a data sending device may further include a communications unit, configured to support communication with another network side device, for example, communication with a core network node. In a possible example, the device may further include a memory, and the memory is configured to couple to the processor, and store a program instruction and data that are required by the data sending device. The processor is configured to control and manage an action of the device, and is configured to perform processing performed by the device in the foregoing embodiments, for example, configured to control the device to perform processing on data transmission and/or perform another process of the technology described in this application. In the example corresponding to FIG. 21, the structure of the device in this application includes a transmitter 2101, a receiver 2102, a processor 2103, and a memory 2104.

It may be understood that FIG. 21 shows merely a simplified design of the device. In actual application, the device may include any quantity of transmitters, receivers, processors, memories, and the like, and all data receiving devices that can implement this application fall within the protection scope of this application.

This application further provides a device, and the device has functions of implementing the foregoing embodiments. The functions may be implemented by using hardware, or may be implemented by executing corresponding software by hardware. The hardware or software includes one or more modules corresponding to the foregoing functions.

The embodiments of this application may be mutually referenced, and the embodiments of this application may be performed by a network device and user equipment accordingly.

The processor configured to perform functions of the device in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the data receiving device and/or the data sending device. Certainly, the processor and the storage medium may exist in the data receiving device or the data sending device as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A method, comprising:
receiving, by an apparatus, a plurality of sets, wherein the plurality of sets comprises a set of k0s and a set of k2s, each k0 of the set of k0s indicates a time relationship between a time unit used to transmit a physical downlink control channel and a time unit used to transmit a physical downlink shared channel, and each k2 of the set of k2s is a time relationship between a time unit used to transmit the physical downlink control channel and a time unit used to transmit a physical uplink shared channel, and each set of the plurality of sets respectively corresponds to a subcarrier spacing;
receiving, by the apparatus, downlink control information in an $n^{th}$ time unit of the physical downlink control channel, wherein the downlink control information carries an indication of k0 value information or an indication of k2 value information, and n is an integer;
determining, by the apparatus, a value of k0 or a value of k2 based on the downlink control information and a subcarrier spacing of a data transmission channel, wherein the data transmission channel is the physical downlink shared channel or the physical uplink shared channel; and
performing, by the apparatus, data transmission in a time unit relating to n and x on the data transmission channel, wherein x is the determined value of k0 or the determined value of k2.

2. The method according to claim 1, wherein a numerology of the physical downlink control channel is different from a numerology of the data transmission channel.

3. The method according to claim 1, wherein the downlink control information carries the indication of the k2 value information, and the data transmission channel is the physical uplink shared channel.

4. The method according to claim 3, wherein x is the determined value of k2, and performing the data transmission in the time unit relating to n and x on the data transmission channel comprises:
transmitting, by the apparatus, data in an $(n+k2)^{th}$ time unit on the physical uplink shared channel, wherein k2 is an integer.

5. The method according to claim 1, wherein the downlink control information carries the indication of the k0 value information, and the data transmission channel is the physical downlink shared channel.

6. The method according to claim 5, wherein x is the determined value of k0, and performing data transmission in the time unit relating to n and x on the data transmission channel comprises:
receiving, by the apparatus, data in an $(n+k0)^{th}$ time unit on the physical downlink shared channel, wherein k0 is an integer.

7. The method according to claim 6, further comprising:
transmitting, by the apparatus, feedback information in an $(n+k0+k1)^{th}$ time unit on a physical uplink control channel, wherein k1 is based on a numerology of the physical uplink control channel, and k1 is an integer.

8. The method according to claim 7, wherein the numerology of the physical uplink control channel is different from a numerology of the physical downlink shared channel.

9. An apparatus, comprising at least one circuit, configured to:

receive a plurality of sets, wherein the plurality of sets comprises a set of k0s and a set of k2s, each k0 of the set of k0s indicates a time relationship between a time unit used to transmit a physical downlink control channel and a time unit used to transmit a physical downlink shared channel, and each k2 of the set of k2s is a time relationship between a time unit used to transmit the physical downlink control channel and a time unit used to transmit a physical uplink shared channel, and each set of the plurality of sets respectively corresponds to a subcarrier spacing;

receive downlink control information in an $n^{th}$ time unit of physical downlink control channel, wherein the downlink control information carries an indication of k0 value information or an indication of k2 value information, and n is an integer;

determine a value of k0 or a value of k2 based on the downlink control information and a subcarrier spacing of a data transmission channel, wherein the data transmission channel is the physical downlink shared channel or the physical uplink shared channel; and perform data transmission in a time unit relating to n and x on the data transmission channel, wherein x is the determined value of K0 or the determined value of K2.

10. The apparatus according to claim 9, wherein a numerology of the physical downlink control channel is different from a numerology of the data transmission channel.

11. The apparatus according to claim 9, wherein the downlink control information carries the indication of the k2 value information, and the data transmission channel is the physical uplink shared channel.

12. The apparatus according to claim 11, wherein x is the determined value of k2, the at least one circuit is configured to transmit data in an $(n+k2)^{th}$ time unit on the physical uplink shared channel, and k2 is an integer.

13. The apparatus according to claim 9, wherein the downlink control information carries the indication of the k0 value information, and the data transmission channel is the physical downlink shared channel.

14. The apparatus according to claim 13, wherein x is the determined value of k0, the at least one circuit is configured to receive data in an $(n+k0)^{th}$ time unit on the physical downlink shared channel, and k0 is an integer.

15. The apparatus according to claim 14, wherein the at least one circuit is further configured to transmit feedback information in an $(n+k0+k1)^{th}$ time unit on a physical uplink control channel, wherein k1 is based on a numerology of the physical uplink control channel, and k1 is an integer.

16. The apparatus according to claim 15, wherein the numerology of the physical uplink control channel is different from a numerology of the physical downlink shared channel.

17. A non-transitory computer-readable medium comprising instructions that, when executed, cause an apparatus to:

receive a plurality of sets, wherein the plurality of sets comprises a set of kos and a set of k2s, each K0 of the set of k0s indicates a time relationship between a time unit used to transmit a physical downlink control channel and a time unit used to transmit a physical downlink shared channel, and each k2 of the set of K2s is a time relationship between a time unit used to transmit the physical downlink control channel and a time unit used to transmit a physical uplink shared channel, and each set of the plurality of sets respectively corresponds to a subcarrier spacing;

receive downlink control information in an $n^{th}$ time unit of physical downlink control channel, wherein the downlink control information carries an indication of k0 value information or an indication of k2 value information, and n is an integer;

determine a value of k0 or a value of k2 based on the downlink control information and a subcarrier spacing of a data transmission channel, wherein the data transmission channel is the physical downlink shared channel or the physical uplink shared channel; and perform data transmission in a time unit relating to n and x on a data transmission channel, wherein x is the determined value of k0 or the determined value of k2.

18. The medium according to claim 17, wherein a numerology of the physical downlink control channel is different from a numerology of the data transmission channel.

* * * * *

UNITED STATES PATENT AND TRADEMARK OFFICE
CERTIFICATE OF CORRECTION

PATENT NO. : 11,304,220 B2
APPLICATION NO. : 16/712547
DATED : April 12, 2022
INVENTOR(S) : Peng et al.

Page 1 of 1

It is certified that error appears in the above-identified patent and that said Letters Patent is hereby corrected as shown below:

In the Claims

Claim 17, Column 30, Line 15; delete "kos" and insert --k0s--.

Signed and Sealed this
Seventh Day of June, 2022

Katherine Kelly Vidal
*Director of the United States Patent and Trademark Office*